US011194934B2

(12) United States Patent
Fiske

(10) Patent No.: US 11,194,934 B2
(45) Date of Patent: *Dec. 7, 2021

(54) CLOCK AND PERIODIC COMPUTING MACHINES

(71) Applicant: Michael Stephen Fiske, San Francisco, CA (US)

(72) Inventor: Michael Stephen Fiske, San Francisco, CA (US)

(73) Assignee: Aemea Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/700,803

(22) Filed: Dec. 2, 2019

(65) Prior Publication Data

US 2020/0104534 A1 Apr. 2, 2020

Related U.S. Application Data

(63) Continuation-in-part of application No. 15/629,149, filed on Jun. 21, 2017, now Pat. No. 10,498,528.

(51) Int. Cl.
*H04L 9/00* (2006.01)
*G06F 21/72* (2013.01)
*G06F 21/76* (2013.01)

(52) U.S. Cl.
CPC ............ *G06F 21/725* (2013.01); *G06F 21/76* (2013.01)

(58) Field of Classification Search
CPC ............ G06F 1/10; G06F 21/725; G06F 21/76
See application file for complete search history.

(56) References Cited

U.S. PATENT DOCUMENTS

| 4,253,188 A * | 2/1981 | Gable | ..................... H04L 7/033 375/346 |
|---|---|---|---|
| 7,222,238 B2 * | 5/2007 | Bleumer | ............... H04L 9/3226 705/60 |
| 2015/0276874 A1 * | 10/2015 | Morton | .......... G01R 31/318552 714/727 |
| 2016/0262122 A1 * | 9/2016 | Aldana | ................. H04J 3/0667 |

* cited by examiner

*Primary Examiner* — Ghazal B Shehni

(57) ABSTRACT

A new computational machine is invented, called a clock machine, that is a novel alternative to computing machines (digital computers) based on logic gates. In an embodiment, computation is performed with one or more clock machines that use time. In an embodiment, a cryptographic cipher is implemented with random clock machines, constructed from a non-deterministic process, wherein the compiled set of instructions (i.e., the implementation of the cryptographic procedure) is distinct on each device or chip that executes the cryptographic cipher. In an embodiment, by using a different set of clock machines to execute two different instances of the same cryptographic procedure, each execution of a procedure looks different to malware that may try to infect and subvert the cryptographic procedure. This cryptographic process also makes timing attacks more challenging. In an embodiment, a detailed implementation of the Midori cipher with random clock machines is described.

24 Claims, 31 Drawing Sheets

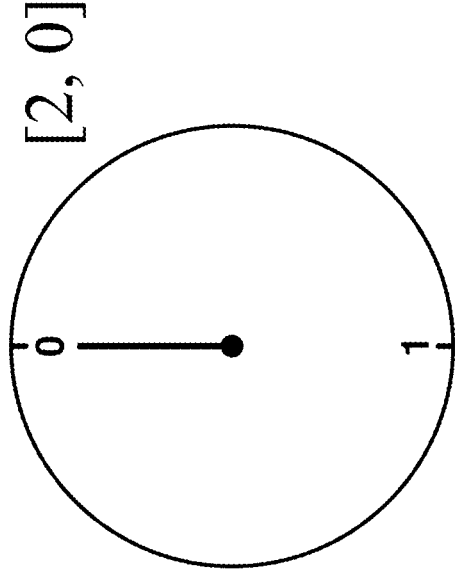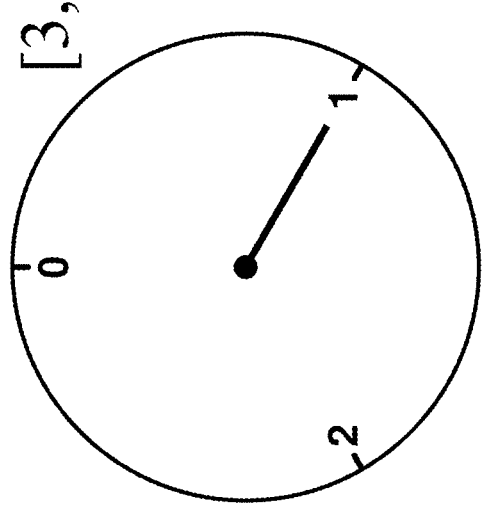
FIG. 1A

FIG. 1B         110
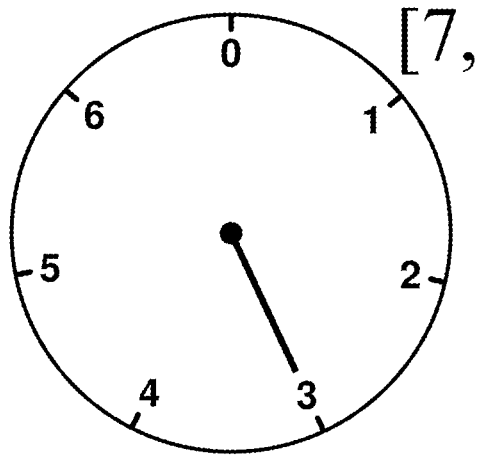
[7, 3]   Clock Machine
         112
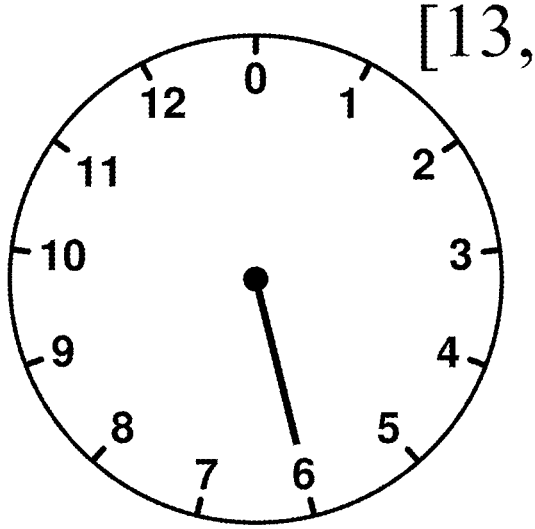
[13, 6]  Clock Machine
         114

A gate based circuit that computes $[7, 3] \bigoplus [13, 6]$ on $\{0, 1\}^4$

D-Type Flip Flop 400

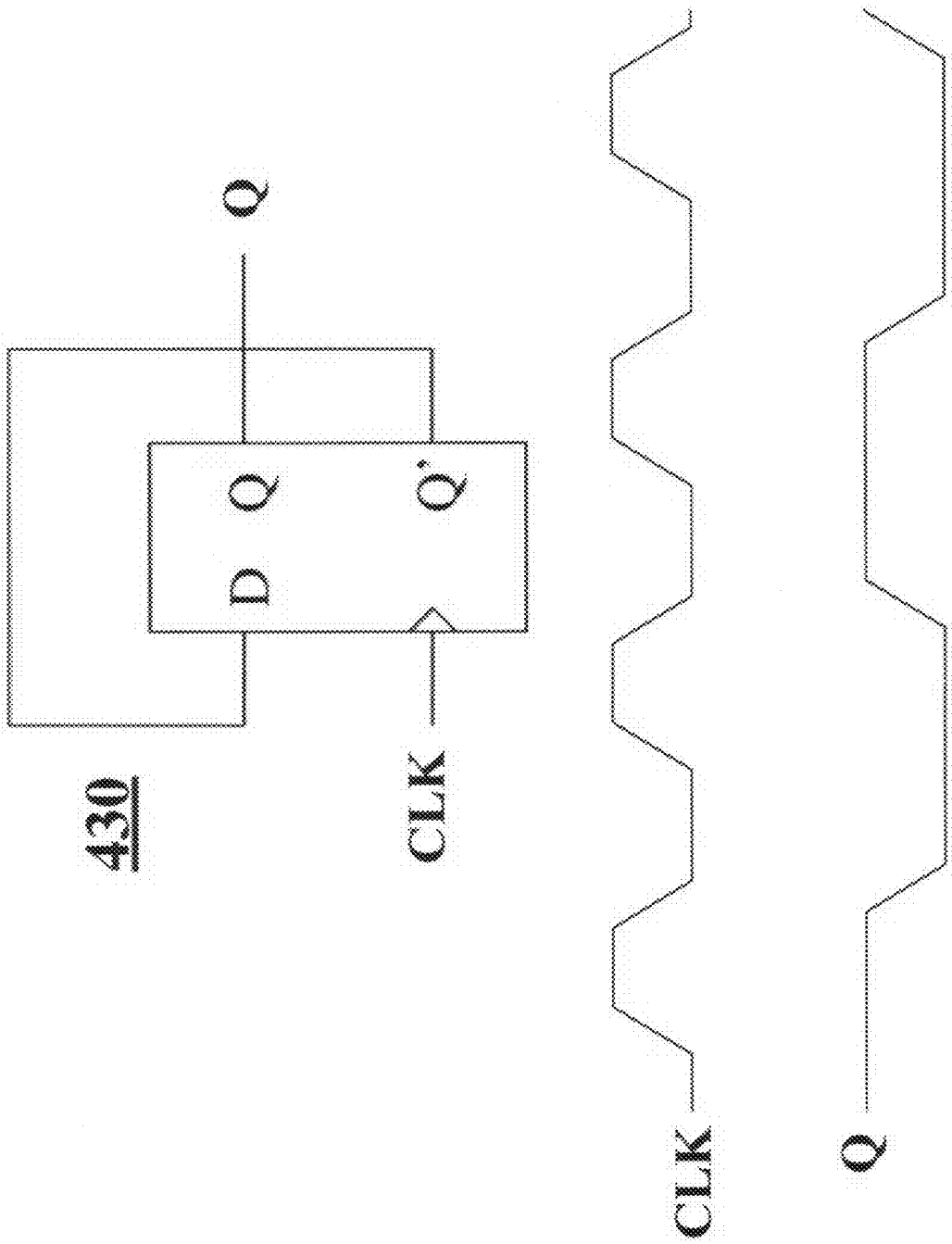

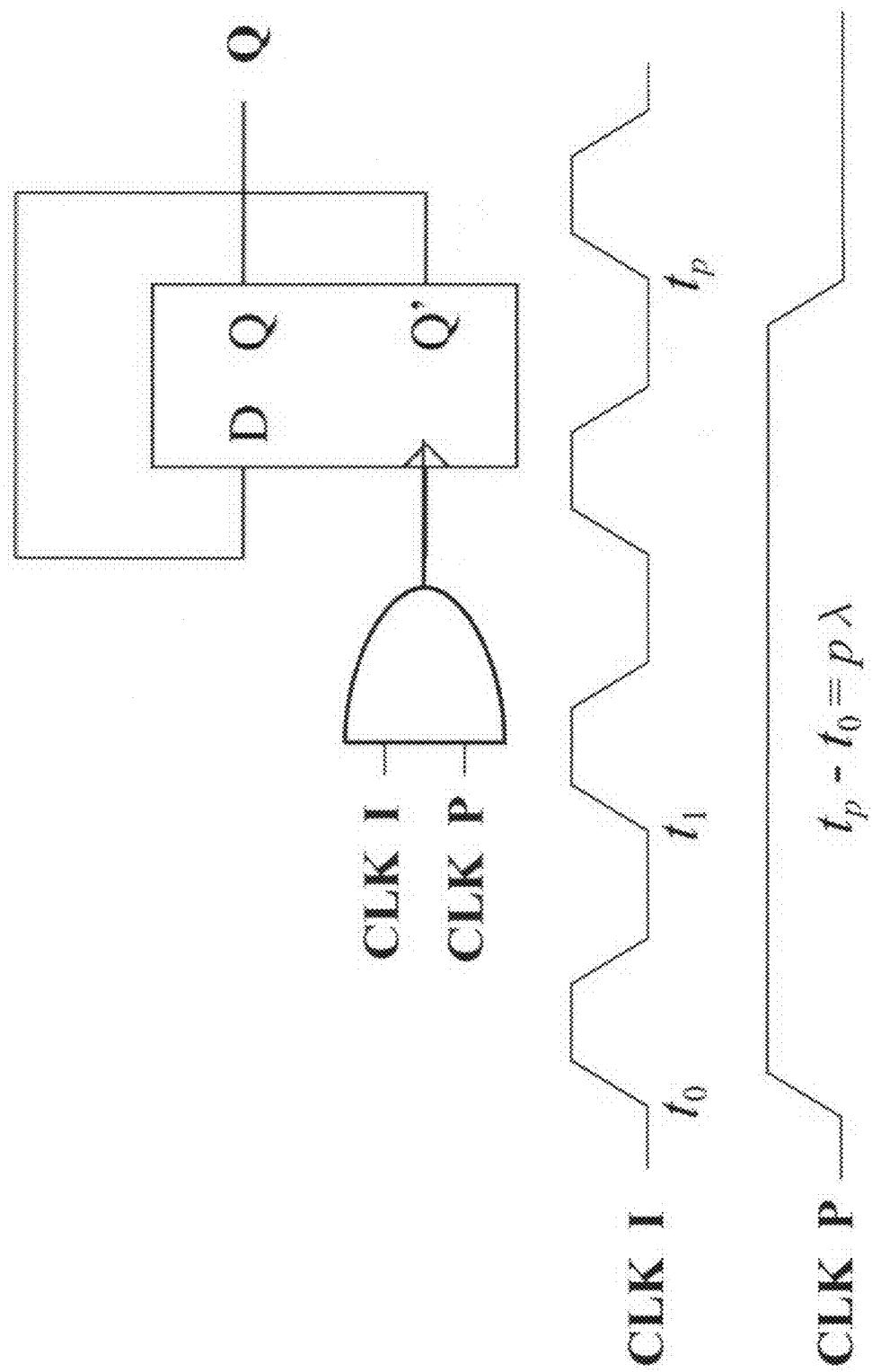

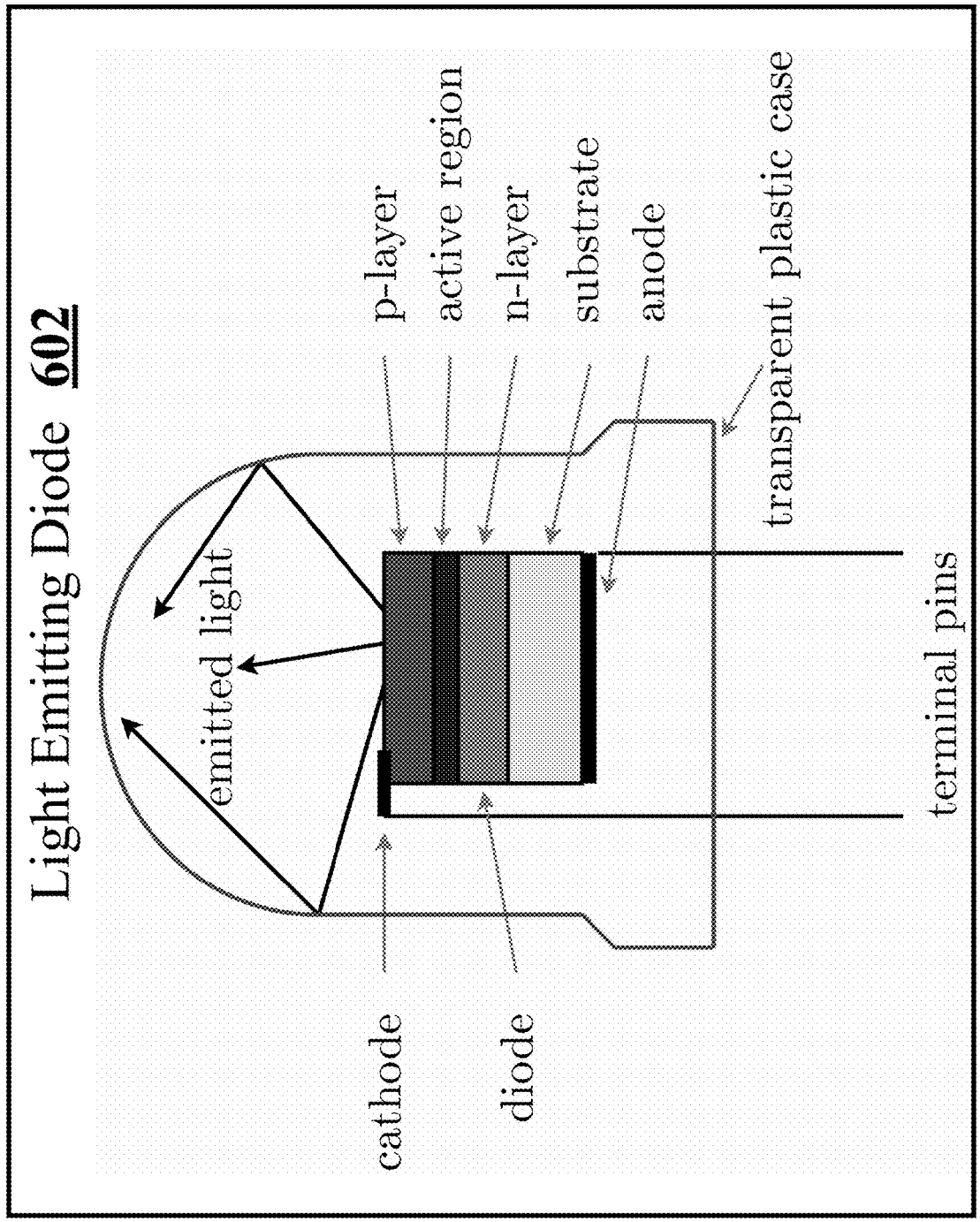

FIG. 7

Some 2-Clocks, 3-Clocks and Prime Clock Sums in $\mathbb{Z}_2^{\mathbb{N}}$

| Time State | [2,0] | [2,1] | [3,0] | [3,1] | [2,0]⊕[3,0] | [2,1]⊕[3,0] | [2,0]⊕[3,1] |
|---|---|---|---|---|---|---|---|
| 0 | 0 | 1 | 0 | 1 | 0 | 1 | 1 |
| 1 | 1 | 0 | 1 | 2 | 0 | 1 | 1 |
| 2 | 0 | 1 | 2 | 0 | 0 | 1 | 0 |
| 3 | 1 | 0 | 0 | 1 | 1 | 0 | 0 |
| 4 | 0 | 1 | 1 | 2 | 1 | 0 | 0 |
| 5 | 1 | 0 | 2 | 0 | 1 | 0 | 1 |
| 6 | 0 | 1 | 0 | 1 | 0 | 1 | 1 |
| 7 | 1 | 0 | 1 | 2 | 0 | 1 | 1 |
| ⋮ | | | | | | | |

FIG. 8

The 5-clocks projected into $\Omega_2$

| Time State | [5, 0] | [5, 1] | [5, 2] | [5, 3] | [5, 4] | [5, 0] ⊕ [5, 1] | [5, 2] ⊕ [5, 3] ⊕ [5, 4] |
|---|---|---|---|---|---|---|---|
| 0 | 0 | 1 | 0 | 1 | 0 | 1 | 1 |
| 1 | 1 | 0 | 1 | 0 | 0 | 1 | 1 |
| 2 | 0 | 1 | 0 | 0 | 1 | 1 | 1 |
| 3 | 1 | 0 | 0 | 1 | 0 | 1 | 1 |
| 4 | 0 | 0 | 1 | 0 | 1 | 0 | 0 |
| 5 | 0 | 1 | 0 | 1 | 0 | 1 | 1 |
| ⋮ | | | | | | | |

FIG. 9

Some Prime Clocks and their Sum in $\Omega_5$

| Time State | [5, 3] | [7, 6] | [11, 3] | [13, 0] | [5, 3] $\oplus_5$ [7, 6] $\oplus_5$ [11, 3] $\oplus_5$ [13, 0] |
|---|---|---|---|---|---|
| 0 | 3 | 6 | 3 | 0 | 2 |
| 1 | 4 | 0 | 4 | 1 | 4 |
| 2 | 0 | 1 | 5 | 2 | 3 |
| 3 | 1 | 2 | 6 | 3 | 2 |
| 4 | 2 | 3 | 7 | 4 | 1 |
| 5 | 3 | 4 | 8 | 5 | 0 |
| 6 | 4 | 5 | 9 | 6 | 4 |
| 7 | 0 | 6 | 10 | 7 | 3 |
| 8 | 1 | 0 | 0 | 8 | 4 |
| ⋮ | | | | | |

FIG. 10

The 7-clocks projected into $\Omega_2$

| Time State | [7,0] | [7,1] | [7,2] | [7,3] | [7,4] | [7,5] | [7,6] |
|---|---|---|---|---|---|---|---|
| 0 | 0 | 1 | 0 | 1 | 0 | 1 | 0 |
| 1 | 1 | 0 | 1 | 0 | 1 | 0 | 0 |
| 2 | 0 | 1 | 0 | 1 | 0 | 0 | 1 |
| 3 | 1 | 0 | 1 | 0 | 0 | 1 | 0 |
| 4 | 0 | 1 | 0 | 0 | 1 | 0 | 1 |
| 5 | 1 | 0 | 0 | 1 | 0 | 1 | 0 |
| 6 | 0 | 0 | 1 | 0 | 1 | 0 | 1 |
| 7 | 0 | 1 | 0 | 1 | 0 | 1 | 0 |
| ... | | | | | | | |

In the truth table, $\{0,1\}^2$ is ordered as $\{00, 01, 10, 11\}$.

| Boolean Function | Truth Table | Prime Clock Sum |
|---|---|---|
| $f_1(x,y) = 1$ | 1111 | $[2,0] \oplus [2,1]$ |
| $f_2(x,y) = 0$ | 0000 | $[2,0] \oplus [2,0]$ |
| $f_3(x,y) = x$ | 0011 | $[2,1] \oplus [3,1]$ |
| $f_4(x,y) = y$ | 0101 | $[2,0]$ |
| $f_5(x,y) = \neg x$ | 1100 | $[2,0] \oplus [3,1]$ |
| $f_6(x,y) = \neg y$ | 1010 | $[2,1]$ |
| $f_7(x,y) = x \wedge y$ | 0001 | $[2,0] \oplus [3,0]$ |
| $f_8(x,y) = x \vee y$ | 0111 | $[2,0] \oplus [3,2]$ |
| $f_9(x,y) = \neg x \vee y$ | 1101 | $[3,0] \oplus [3,1]$ |
| $f_{10}(x,y) = x \vee \neg y$ | 1011 | $[3,1] \oplus [3,2]$ |
| $f_{11}(x,y) = (x \wedge y) \vee \neg(x \vee y)$ | 1001 | $[3,1]$ |
| $f_{12}(x,y) = (x \vee y) \wedge \neg(x \wedge y)$ | 0110 | $[3,0] \oplus [3,2]$ |
| $f_{13}(x,y) = \neg(x \vee y)$ | 1000 | $[2,1] \oplus [3,2]$ |
| $f_{14}(x,y) = \neg(x \wedge y)$ | 1110 | $[2,1] \oplus [3,0]$ |
| $f_{15}(x,y) = \neg x \wedge y$ | 0100 | $[3,0]$ |
| $f_{16}(x,y) = x \wedge \neg y$ | 0010 | $[3,2]$ |

FIG. 12

2-Bit Multiplication.

Multiplication functions $\mathcal{M}_i : \{0,1\}^4 \to \{0,1\}$.

| $u$ | $l$ | $\mathcal{M}_3$ | $\mathcal{M}_2$ | $\mathcal{M}_1$ | $\mathcal{M}_0$ |
|---|---|---|---|---|---|
| 00 | 00 | 0 | 0 | 0 | 0 |
| 00 | 01 | 0 | 0 | 0 | 0 |
| 00 | 10 | 0 | 0 | 0 | 0 |
| 00 | 11 | 0 | 0 | 0 | 0 |
| 01 | 00 | 0 | 0 | 0 | 0 |
| 01 | 01 | 0 | 0 | 0 | 1 |
| 01 | 10 | 0 | 0 | 1 | 0 |
| 01 | 11 | 0 | 0 | 1 | 1 |
| 10 | 00 | 0 | 0 | 0 | 0 |
| 10 | 01 | 0 | 0 | 1 | 0 |
| 10 | 10 | 0 | 1 | 0 | 0 |
| 10 | 11 | 0 | 1 | 1 | 0 |
| 11 | 00 | 0 | 0 | 0 | 0 |
| 11 | 01 | 0 | 0 | 1 | 1 |
| 11 | 10 | 0 | 1 | 1 | 0 |
| 11 | 11 | 1 | 0 | 0 | 1 |

FIG. 13

Parameters for Midori

| Cipher | Block Size ($n$) | Key Size | Cell Size ($m$) | Number of Rounds |
|---|---|---|---|---|
| Midori 64 | 64 | 128 | 4 | 16 |
| Midori 128 | 128 | 128 | 8 | 20 |

FIG. 14

Midori 4-bit Bijective Substitution Boxes

| $x$ | 0 | 1 | 2 | 3 | 4 | 5 | 6 | 7 | 8 | 9 | a | b | c | d | e | f |
|---|---|---|---|---|---|---|---|---|---|---|---|---|---|---|---|---|
| $S_0(x)$ | c | a | d | 3 | e | b | f | 7 | 8 | 9 | 1 | 5 | 0 | 2 | 4 | 6 |
| $S_1(x)$ | 1 | 0 | 5 | 3 | e | 2 | f | 7 | d | a | 9 | b | c | 8 | 4 | 6 |

FIG. 15

Midori Round Constants

| $i$ | $\beta_i$ | $i$ | $\beta_i$ | $i$ | $\beta_i$ | $i$ | $\beta_i$ | $i$ | $\beta_i$ | $i$ | $\beta_i$ |
|---|---|---|---|---|---|---|---|---|---|---|---|
| 0 | 0 0 1 0 | 1 | 0 1 1 0 | 2 | 1 0 0 0 | 3 | 0 0 0 0 | 4 | 0 0 0 0 | 5 | 1 0 0 0 |
|   | 0 1 0 0 | | 1 0 1 0 | | 0 1 0 1 | | 1 0 0 0 | | 1 0 0 0 | | 1 0 1 0 |
|   | 0 0 1 1 | | 1 0 0 0 | | 1 0 1 0 | | 1 1 0 1 | | 0 0 0 0 | | 0 0 1 0 |
|   | 1 1 1 1 | | 1 0 0 0 | | 0 0 1 1 | | 0 0 1 1 | | 1 0 0 1 | | 1 1 1 0 |
| 6 | 0 0 0 0 | 7 | 0 1 1 1 | 8 | 1 0 1 0 | 9 | 0 0 1 0 | 10 | 0 0 1 0 | 11 | 0 0 0 1 |
|   | 0 0 1 1 | | 0 0 1 1 | | 0 1 0 0 | | 1 0 0 0 | | 1 0 0 1 | | 1 0 0 1 |
|   | 0 1 1 1 | | 0 1 0 0 | | 0 0 0 0 | | 0 0 1 0 | | 1 0 0 1 | | 1 1 0 1 |
|   | 0 0 0 0 | | 0 1 0 0 | | 1 0 0 1 | | 0 0 1 0 | | 1 1 1 1 | | 0 0 0 0 |
| 12 | 0 0 0 0 | 13 | 1 1 1 1 | 14 | 1 1 1 1 | 15 | 0 1 1 0 | 16 | 0 1 1 0 | 17 | 0 0 1 0 |
|   | 1 0 0 0 | | 1 0 1 0 | | 1 0 1 0 | | 1 1 0 0 | | 1 1 0 0 | | 0 1 0 1 |
|   | 0 0 1 0 | | 1 0 0 1 | | 1 0 0 1 | | 1 0 0 0 | | 1 0 0 0 | | 0 0 1 0 |
|   | 1 1 1 0 | | 1 0 0 0 | | 0 0 0 1 | | 1 0 0 1 | | 0 0 0 1 | | 1 0 0 0 |
| 18 | 0 0 1 1 | | | | | | | | | | |
|   | 1 0 0 0 | | | | | | | | | | |
|   | 1 1 0 1 | | | | | | | | | | |
|   | 0 0 0 0 | | | | | | | | | | |

FIG. 16

Midori64 Boolean Functions $\pi_i \circ S_0 : \{0,1\}^4 \to \{0,1\}$

| $x$ | 0 | 1 | 2 | 3 | 4 | 5 | 6 | 7 | 8 | 9 | a | b | c | d | e | f | Random Prime Clock Sum |
|---|---|---|---|---|---|---|---|---|---|---|---|---|---|---|---|---|---|
| $\pi_0 \circ S_0(x)$ | 0 | 0 | 1 | 1 | 0 | 1 | 1 | 1 | 0 | 1 | 1 | 0 | 0 | 0 | 0 | 0 | $[2,0] \oplus [2,1] \oplus [3,1] \oplus [5,1] \oplus [11,0] \oplus [17,5]$ |
| $\pi_1 \circ S_0(x)$ | 0 | 1 | 0 | 1 | 1 | 1 | 1 | 1 | 0 | 0 | 0 | 0 | 0 | 1 | 0 | 1 | $[2,1] \oplus [5,2] \oplus [13,11] \oplus [13,12]$ |
| $\pi_2 \circ S_0(x)$ | 1 | 0 | 1 | 0 | 1 | 0 | 1 | 1 | 0 | 0 | 0 | 1 | 0 | 0 | 1 | 1 | $[3,0] \oplus [3,1] \oplus [7,6] \oplus [13,9] \oplus [17,8] \oplus [19,11]$ |
| $\pi_3 \circ S_0(x)$ | 1 | 1 | 1 | 0 | 1 | 1 | 1 | 0 | 1 | 1 | 0 | 0 | 0 | 0 | 0 | 0 | $[2,1] \oplus [3,2] \oplus [5,2] \oplus [17,16]$ |

Each random prime clock sum computes $\pi_i \circ S_0(x)$ chosen from 1000 successful executions of machine 5.

The average complexity of these $\pi_i \circ S_0$ prime clock sums is $\frac{1}{4}(36 + 26 + 42 + 24) = 32$.

FIG. 17

Midori128 Boolean Functions $\pi_i \circ S_1 : \{0,1\}^4 \to \{0,1\}$

| $x$ | 0 | 1 | 2 | 3 | 4 | 5 | 6 | 7 | 8 | 9 | a | b | c | d | e | f | Random Prime Clock Sum |
|---|---|---|---|---|---|---|---|---|---|---|---|---|---|---|---|---|---|
| $\pi_0 \circ S_1(x)$ | 1 | 0 | 1 | 1 | 0 | 0 | 1 | 1 | 1 | 1 | 0 | 1 | 1 | 0 | 0 | 0 | $[5,3] \oplus [5,4] \oplus [7,3] \oplus [13,3] \oplus [13,6] \oplus [19,10]$ |
| $\pi_1 \circ S_1(x)$ | 0 | 0 | 0 | 1 | 1 | 1 | 1 | 0 | 1 | 0 | 1 | 0 | 0 | 0 | 0 | 1 | $[3,1] \oplus [5,1] \oplus [7,2] \oplus [7,4] \oplus [13,11] \oplus [17,13]$ |
| $\pi_2 \circ S_1(x)$ | 0 | 0 | 1 | 0 | 1 | 0 | 1 | 1 | 1 | 0 | 0 | 0 | 1 | 0 | 1 | 1 | $[2,1] \oplus [7,6] \oplus [11,0] \oplus [13,3] \oplus [17,10]$ |
| $\pi_3 \circ S_1(x)$ | 0 | 0 | 0 | 0 | 1 | 0 | 1 | 0 | 1 | 1 | 1 | 1 | 1 | 1 | 0 | 0 | $[2,0] \oplus [3,0] \oplus [5,4] \oplus [11,1] \oplus [11,9]$ |

The average complexity of these $\pi_i \circ S_1$ prime clock sums is $\frac{1}{4}(44 + 40 + 36 + 30) = 37.5$.

Machine procedure 5 found these sums with parameters $u = 8$, $s = 50000$, $r_{lb} = 1$ and $r_{ub} = 6$.

FIG. 18

CPU time tests on Prime Clocks $[p, t]$

| Prime Clock:              | 2-Clock  | 3        | 5        | 7        | 11       | 13       | 17       | 19       |
|---------------------------|----------|----------|----------|----------|----------|----------|----------|----------|
| 95% Clock Cycle Range:    | [24, 25] | [24, 25] | [23, 25] | [23, 25] | [23, 25] | [24, 25] | [23, 25] | [24, 25] |

Prime clocks $[p, t]$, where $p \in \{2, 3, 5, 7, 11, 13, 17, 19\}$ and $0 \leq t < p$.

FIG. 19

Affine maps $A_{a_0 a_1 a_2 a_3, 0}(x_0 x_1 x_2 x_3) = a_0 x_0 \oplus a_1 x_1 \oplus a_2 x_2 \oplus a_3 x_3$ on $\{0,1\}^4$

| Affine Map | Random Prime Clock Sum |
|---|---|
| $A_{0000,0}(x) = 0$ | $[11,4] \oplus [19,12]$ |
| $A_{0001,0}(x) = x_3$ | $[2,1] \oplus [19,11]$ |
| $A_{0010,0}(x) = x_2$ | $[2,1] \oplus [13,5] \oplus [17,13] \oplus [19,7]$ |
| $A_{0011,0}(x) = x_2 \oplus x_3$ | $[17,13] \oplus [19,7]$ |
| $A_{0100,0}(x) = x_1$ | $[3,0] \oplus [5,4] \oplus [7,2] \oplus [13,6] \oplus [17,4]$ |
| $A_{0101,0}(x) = x_1 \oplus x_3$ | $[3,0] \oplus [5,1] \oplus [7,4] \oplus [13,11]$ |
| $A_{0110,0}(x) = x_1 \oplus x_2$ | $[5,1] \oplus [7,3] \oplus [7,5] \oplus [13,2] \oplus [13,3] \oplus [19,13]$ |
| $A_{0111,0}(x) = x_1 \oplus x_2 \oplus x_3$ | $[3,1] \oplus [5,0] \oplus [11,7] \oplus [17,6] \oplus [17,11] \oplus [17,13]$ |
| $A_{1000,0}(x) = x_0$ | $[2,0]$ |
| $A_{1001,0}(x) = x_0 \oplus x_3$ | $[2,0] \oplus [2,1] \oplus [17,9]$ |
| $A_{1010,0}(x) = x_0 \oplus x_2$ | $[13,1] \oplus [13,9]$ |
| $A_{1011,0}(x) = x_0 \oplus x_2 \oplus x_3$ | $[2,0] \oplus [13,1] \oplus [13,9]$ |
| $A_{1100,0}(x) = x_0 \oplus x_1$ | $[3,2] \oplus [5,3] \oplus [7,1] \oplus [11,3] \oplus [13,12]$ |
| $A_{1101,0}(x) = x_0 \oplus x_1 \oplus x_3$ | $[5,3] \oplus [7,0] \oplus [13,3] \oplus [17,11] \oplus [19,15]$ |
| $A_{1110,0}(x) = x_0 \oplus x_1 \oplus x_2$ | $[2,0] \oplus [17,3] \oplus [17,7] \oplus [17,11] \oplus [17,15]$ |
| $A_{1111,0}(x) = x_0 \oplus x_1 \oplus x_2 \oplus x_3$ | $[7,1] \oplus [11,1] \oplus [11,9] \oplus [17,3] \oplus [19,11]$ |

The prime clock sums of these 16 affine maps have average complexity 28.125.

Each prime clock sum interprets its domain value $x = x_0 x_1 x_2 x_3$ as $x_0 + 2x_1 + 4x_2 + 8x_3$.

For each affine map, the random prime clock sums is a solution selected from 1000 successful experiments. Algorithm 5 found these prime clock sums with parameter $u = 8$, $s = 50000$, and number of clocks parameters $r_{lb} = 1$ and $r_{ub} = 6$.

CLOCK AND PERIODIC COMPUTING MACHINES

1 RELATED APPLICATIONS

This application claims priority benefit of U.S. Provisional Patent Application Ser. No. 62/357,191, entitled Prime Clock Computers, filed Jun. 30, 2016, which is incorporated herein by reference. This application is a continuation-in-part of U.S. Non-provisional patent application Ser. No. 15/629,149 entitled Clock Computing Machines, filed Jun. 21, 2017, which is incorporated herein by reference.

2 BACKGROUND

Field of Invention

This invention broadly relates to computing machines and computers. This invention also demonstrates embodiments of this new computer that compute cryptographic machines and hence protect the privacy of information and also protect the execution of the computation.

3 PRIOR ART

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions Physical implementations of digital computers began in the latter half of the 1930's and early designs were based on various implementations of logic gates [1, 7, 30, 35, 36] (e.g., mechanical switches, electro-mechanical devices, vacuum tubes). The transistor was conceptually invented [21, 22] in the late 1920's, but the first working prototype [3, 27] was not demonstrated until 1947. Transistors act as building blocks for logic gates when they operate above threshold [23] (page 39). When a transistor operates above threshold, it essentially acts as a switch which has two states on or off. The transistor enabled the invention of the integrated circuit [18, 26], which is the physical basis for modern digital computers [16, 17].

4 SUMMARY AND SOME ADVANTAGES OVER PRIOR ART

This invention presents and describes a new computational machine, called a clock machine, that is a novel alternative to computing machines (computers) based on logic gates [28, 31]. This invention describes how to perform computation using one or more clock machines. In some embodiments, the number of time states of a clock is a prime number. For example, as shown in FIG. 1B, clock machine 114 has 13 distinct time states and starts at time state 6. In FIG. 1B, another clock machine 112 has 7 distinct time states and starts at time state 3. In some embodiments, another distinct clock machine may 101 distinct time states. In some embodiments, another distinct clock machine may have 7829 distinct time states. Note the traditional clock has 12 distinct time states, labelled 1, 2, 3, 4, 5, 6, . . . , 12 and is shown in FIG. 1C.

In some alternative embodiments, a clock machine may have a composite number of time states. For example, a clock machine may have a number of time states that is a power of 2 even though $2^n$ when $n>1$ is not prime. For example, 128 time states is $2^8$ and 65536 time states is $2^{16}$ and 18446744073709551616 time states is $2^{64}$. The invention described herein combines a finite collection of clock machines to construct a clock computing machine. In some embodiments, clock computing machines may be constructed without using gates or switches.

In some embodiments, a new computational machine (computer) is invented based on the prime numbers and clocks. Consider the prime number 2 and the clock machine [2, 0]. The 2 means that the clock machine has two states {0, 1} and the 0 means that the clock machine starts ticking from time state 0 at time 0. At the next moment of time (i.e., at time 1), clock machine [2, 0] moves to time state 1 and then back to time state 0. Thus, the clock machine [2, 0] ticks 0, 1, 0, 1, and so on. Prime clock [2, 0] machine 102 is shown in FIG. 1A. The clock machine [3, 1] has 3 states {0, 1, 2} and ticks 1, 2, 0, 1, 2, 0 and so on. A [3, 1] prime clock machine 104 is shown in FIG. 1A. These two clock machines, and their respective time states as time proceeds, are also shown in columns 2 and 5 of FIG. 7.

Expressed as the $\oplus$ operator machine in FIG. 7, two or more clock machines can be composed and their sum computed in (computed in) $\mathbb{Z}_2^\mathbb{N}$. For example, the last column of FIG. 7 shows the sum of clocks [2, 0] and [3, 1], projected into $\mathbb{Z}_2^\mathbb{N}$. In an embodiment, the computation of clock machines is projected into $\mathbb{Z}_2^\mathbb{N}$, since this results in the computation of Boolean functions.

A collection of clock machines generate a commutative group, whereby the associative and commutative properties of prime clock sums enable clock machines to perform a computation in parallel. This simple mathematical property has significance because gates do not preserve the associative property. For example, $\neg(x \wedge y) \neq (\neg x) \wedge y$, where operator $\neg$ represents a NOT gate and $\wedge$ represents an OR gate because $\neg(0 \wedge 0)=1$ while $(\neg 0) \wedge 0=0$. In practice, this means that the OR gate computation $\wedge$ must be performed either before the negation (NOT gate) is applied or after the negation is applied. This means the computation with gates is inherently a serial computation.

In an embodiment, this specification describes how to implement an arbitrary Boolean function with a finite collection of clock machines. As the computation of a digital computer can computed by one or more Boolean functions, the specification describes a new computer based on clocks instead of gates.

In an embodiment, this specification shows how to implement the a cryptographic cipher Midori with only a few prime clock machines. Using the first 8 prime numbers, the Midori cipher is executed with random prime clock machines so that a physical instantiation on each processor chip is unique. In some embodiments, each execution of a cryptographic cipher may have a unique physical instantiation in terms of the clock machine instructions that are executing the cryptographic cipher.

The uniqueness of the physical instantiation follows a biological principle whereby a population that exhibits diversity can be far more challenging for predators or a sentient manipulator of that population. As an example, bacteria organisms are typically able to develop antibiotic resistance due at least in part to the fact that each bacteria organism of the same species is still unique in the enzymes (proteins) it can build in order to help disable an antibiotic. As another example of population diversity, the variability of the retrovirus (in particular, AIDS) and its ability to quickly evolve has made it far more difficult for scientists to construct a comprehensive vaccine for the AIDS virus.

By using a different set of clock machines to execute the same procedure, each execution of a procedure looks different to the hacker, who may be attempting to reverse engineer the procedure. In the cybersecurity world, digital computer programs are typically compiled to a sequence of machine instructions so that the sequence of machine instructions are identical on two different instances of the same computer chip. In order for a hacker to infect a computer with malware, it is much easier for the hacker to accomplish this when the sequence of machine instructions are identical or similar on two different instances of a chip or virtual machine. This weakness in current computing systems creates huge vulnerabilities in our Internet infrastructure.

In the recent Mirai attack, malware was able to shut down most of the Internet on the East coast for a substantial part of the day [24]. The Mirai attack and other recent cyber attacks have triggered an urgent alarm that developing new machines, methods and procedures resistant to malware infection is a critical issue for industry and for U.S. infrastructure such as air traffic control, the electrical grid and the Internet.

The uniqueness of the random clock machines helps obfuscate the execution of the cryptographic algorithm and helps break up potential timing patterns in the execution of the cipher. Based on extensive mathematical analysis and computational experiments and tests, the clock computing machines have promising capabilities, particularly for highly nonlinear Boolean functions that are desired in cryptography.

The clock machines, described herein, have an important mathematical property that has practical utility. Covered in section 6.15, theorem 8 states: for every natural number n, every Boolean function $f:\{0, 1\}^n \rightarrow \{0, 1\}$ can be computed with a finite prime clock sum machine that lies inside an infinite abelian group $(\mathbb{Z}_2^{\mathbb{N}}, \oplus)$. Overall, prime clock machines can act as computational building blocks for clock computing machines—instead of gates [31, 28] used in the prior art. Adding is computationally fast and easy to build in hardware. Another favorable computing property is that prime clock machine addition $\oplus$ is associative and commutative.

These two group properties enable prime clock machines to compute in parallel, while computers built from gates do not have this favorable property. For example, $\neg(x \wedge y) \neq (\neg x) \wedge y$ because $\neg(0 \wedge 0)=1$ while $(\neg 0) \wedge 0=0$. In the prior art, the unary gate—and the binary gates $\wedge$, $\vee$ form a Boolean algebra [14], so circuits built from gates must have a depth. This means that the gate-based computers used in the prior art have physical and mathematical limitations on the extent to which the prior art gate-based computers can be parallelized.

To better understand the disparity between the parallelization of prime clock sums versus the circuit depth of gates, consider the prime clock sum $[7, 3] \oplus [13, 6]$. A $[7, 3]$ prime clock and a $[13, 6]$ prime clock are shown in FIG. 1B. FIG. 1D shows a Boolean circuit built from logical gates that computes $[7, 3] \oplus [13, 6]$ on domain $\{0, 1\}^4$. The Boolean circuit and prime clock sum are equivalent to the Boolean function $f:\{0, 1\}^4 \rightarrow \{0, 1\}$ such that $f(x_0 x_1 x_2 x_3) = [(\neg x_2) \wedge (\neg x_3)] \vee [x_0 \wedge x_1 \wedge x_2 \wedge (\neg x_3)] \vee [(\neg(x_0 \wedge x_1)) \wedge (\neg x_2) \wedge x_3]$. Note $[7, 3] \oplus [13, 6](m) = f(x_0 x_1 x_2 x_3)$, where $m = x_0 + 2x_1 + 4x_2 + 8x_3$.

This disparity is further exacerbated for bit strings $x_0 x_1 \ldots x_{n-1}$ of length n (i.e., $x_0 x_1 \ldots x_{n-1}$ lies in $\{0, 1\}^n$) as n increases. Informally Shannon's theorem [28] implies that most functions $f:\{0, 1\}^n \rightarrow \{0, 1\}$ require on the order of $$\frac{2^n}{n}$$

gates. More precisely, let $\beta(\epsilon, n)$ be the number of distinct functions $f:\{0, 1\}^n \rightarrow \{0, 1\}$ that can be computed by circuits with at most $$(1-\epsilon)\frac{2^n}{n}$$

gates built from the NOT, AND, and OR gates. Shannon's theorem states for any $\epsilon > 0$, then $$\lim_{n \rightarrow \infty} \frac{\beta(\epsilon, n)}{2^{2^n}} = 0.$$

Let the gates of a circuit be labeled as $\{g_1, g_2, \ldots, g_m\}$ where m is about $$\frac{2^n}{n}.$$

The graph connectivity of the circuit specifies that the output of gate $g_1$ connects to the input of gate $g_{k_1}$, and so on. Shannon's theorem implies that for most of these Boolean functions the graph connectivity requires an exponential (in n) amount of information. This is readily apparent after comparing the number of symbols used in $[7, 3] \oplus [13, 6]$ versus the symbolic expression $[(\neg(x_0 \wedge x_1)) \wedge (\neg x_2) \wedge x_3] \vee [x_0 \wedge x_1 \wedge x_2 \wedge (\neg x_3)] \vee [(\neg x_2) \wedge (\neg x_3)]$.

Even small prime numbers can help construct a huge number of Boolean functions. Using the first 559 prime numbers, finite prime clock sum machines, (i.e., all primes $\leq 4051$, where 4051 can be represented with 12 bits) can compute any function $f_{20}:\{0, 1\}^{20} \rightarrow \{0, 1\}$, even though there are $2^{2^{20}} = 2^{1048576}$ distinct functions.

Suppose a cryptographic application requires a function $g:\{0, 1\}^{20} \rightarrow \{0, 1\}^{20}$, where $g=(g_0, g_1, \ldots, g_{19})$. For some functions, in the prior art, more than 1 million gates could be required to directly implement g in hardware, since $$\frac{2^{20}}{20} = 52428.$$

Boolean functions with good crytographic properties are highly nonlinear [10], so they usually require about $$\frac{2^n}{n}$$

gates. In our experimental computational tests, we observe that random prime clock machines which compute the Midori64 S-box $S_0$ and the Midori128 S-box $S_1$ have average complexity (definition 4) slightly larger than the affine functions $A_{a_0a_1a_2a_3,c}:\{0, 1\}^4 \rightarrow \{0, 1\}$, where $A_{a_0a_1a_2a_3,c}(x_0x_1x_2x_3) = a_0x_0 \text{ XOR } a_1x_1 \text{ XOR } a_2x_2 \text{ XOR } a_3x_3 \text{ XOR } c$. This is quite different from the low gate complexity (prior art) for Boolean affine functions versus a high gate complexity for highly nonlinear Boolean functions. Overall, virtual machines, computational tests and calculations for n=20 demonstrate that clock computing machines can substantially enhance cryptographic methods and improve computing speed over the prior art.

5 DESCRIPTION OF FIGURES

In the following figures, although they may depict various examples of the invention, the invention is not limited to the examples depicted in the figures.

Figure 1C:
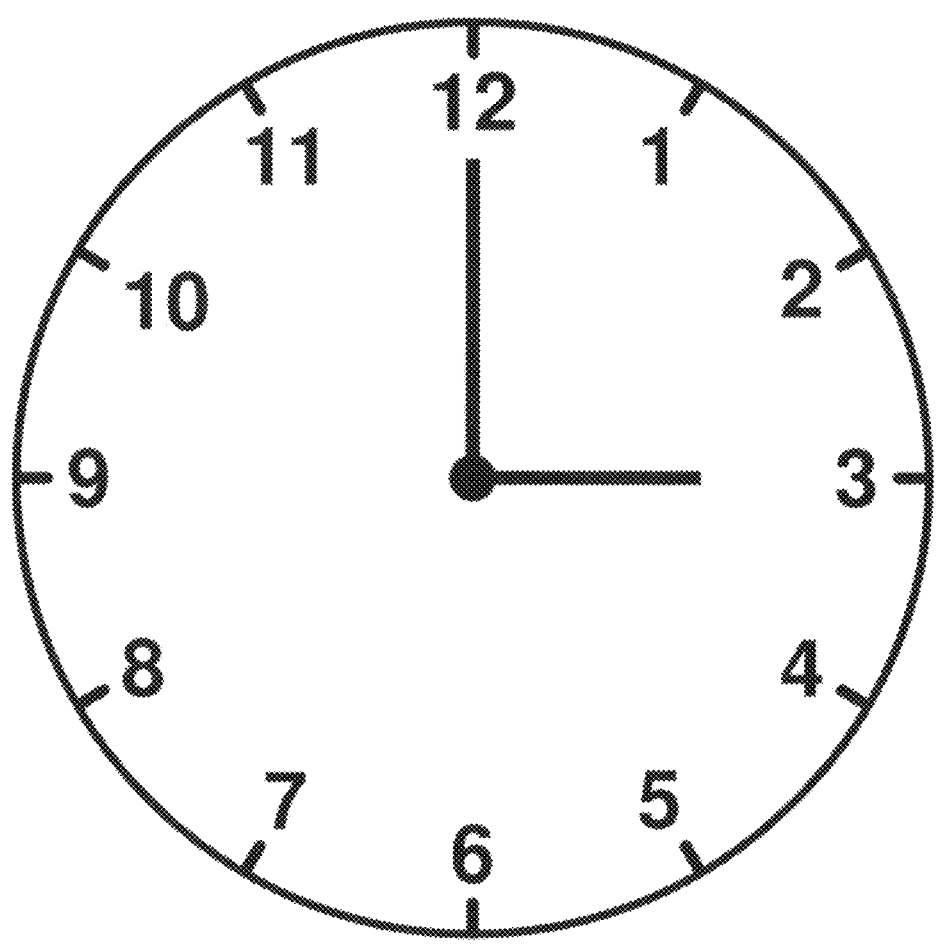
FIG. 1A shows a [2, 0] clock machine 102 and below it a [3, 1] clock machine 104.
FIG. 1B shows a [7, 3] clock machine 112 and below it a [13, 6] clock machine 114.

FIG. 1C shows a standard clock, indicating the time 3 o'clock. In terms of the hour, the standard clock has twelve time states: 1, 2, 3, 4, 5, 6, 7, 8, 9, 10, 11 and 12. On the standard clock, the small hand and large hand indicate the hour and minutes, respectively. When the minute and the hour are used to indicate the time state, the standard clock has 60*12=720 distinct time states.

Figure 1D:
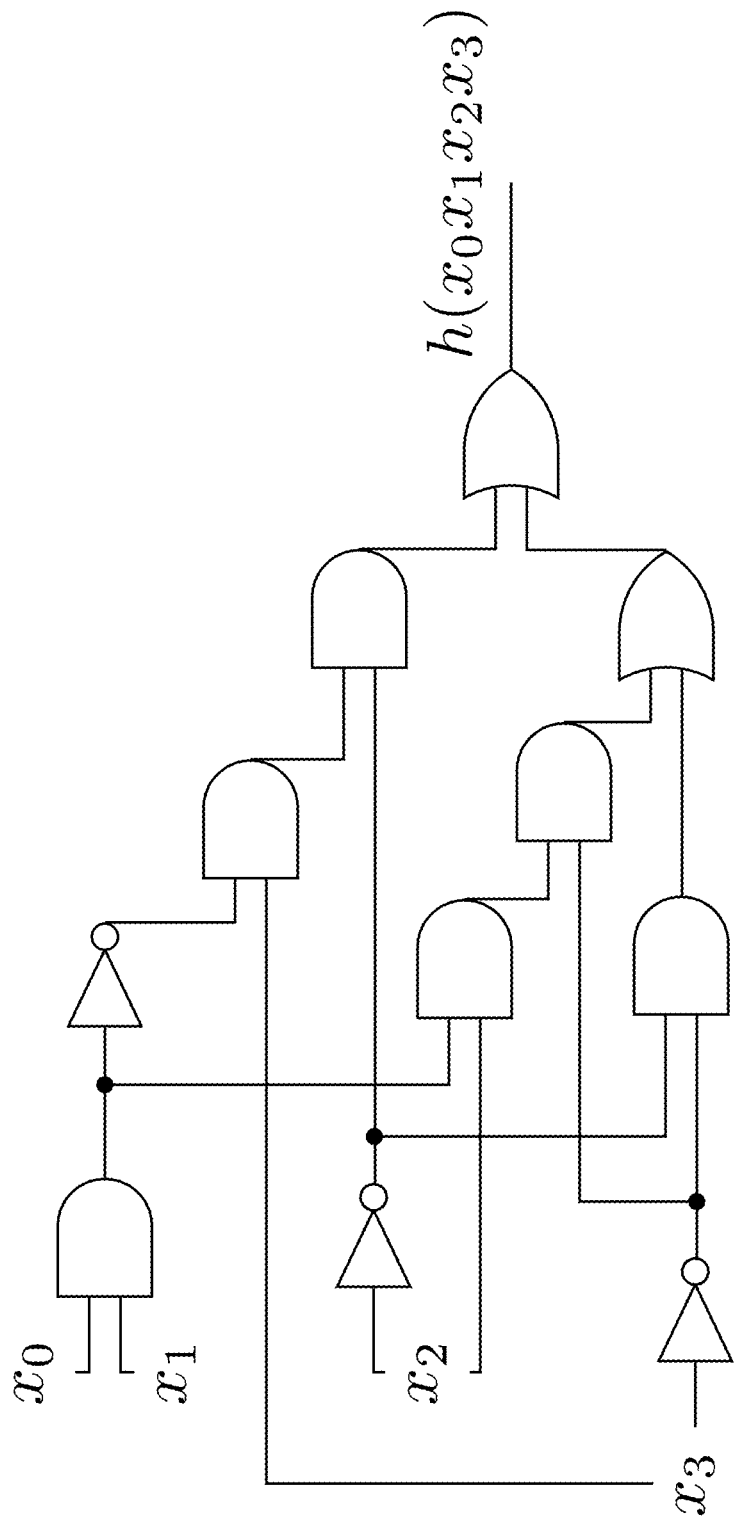

FIG. 1D shows a Boolean circuit built from logic gates that computes Boolean function $f:\{0, 1\} \rightarrow \{0, 1\}$ such that $f(x_0\ x_1\ x_2\ x_3) = [(\neg x_2) \wedge (\neg x_3)] \vee [x_0 \wedge x_1 \wedge x_2 \wedge (\neg x_3)] \vee [(\neg (x_0 \wedge x_1)) \wedge (\neg x_2) \wedge x_3]$.

Figure 2A:
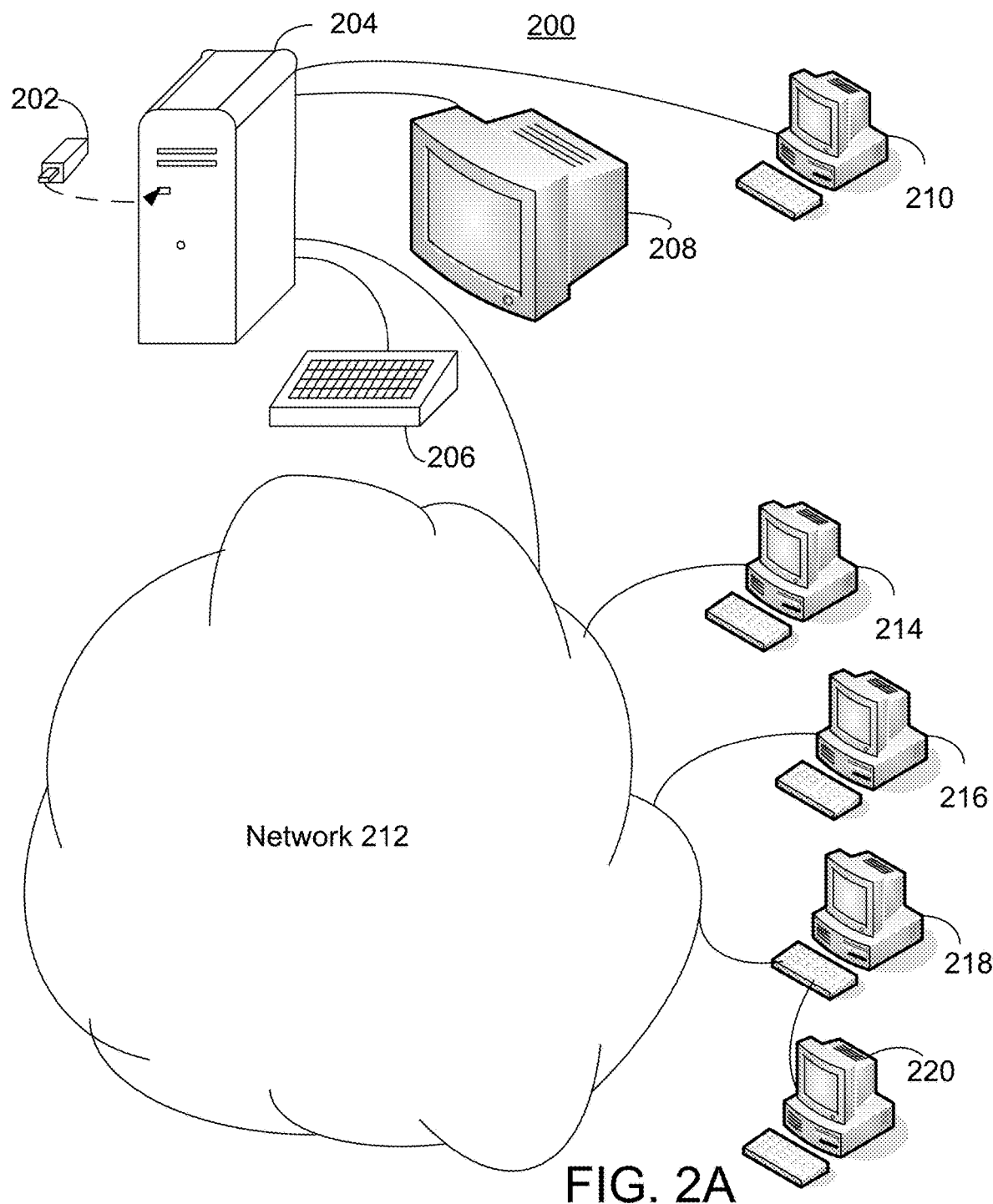

FIG. 2A shows an embodiment of a computer network system using clock machines inside each computer node. In some embodiments, the execution may be over the Internet or a part of a network that supports an infrastructure such as the electrical grid, a financial exchange, or a power plant, which can be used with the embodiments of FIG. 1A and FIG. 1B.

Figure 2B:
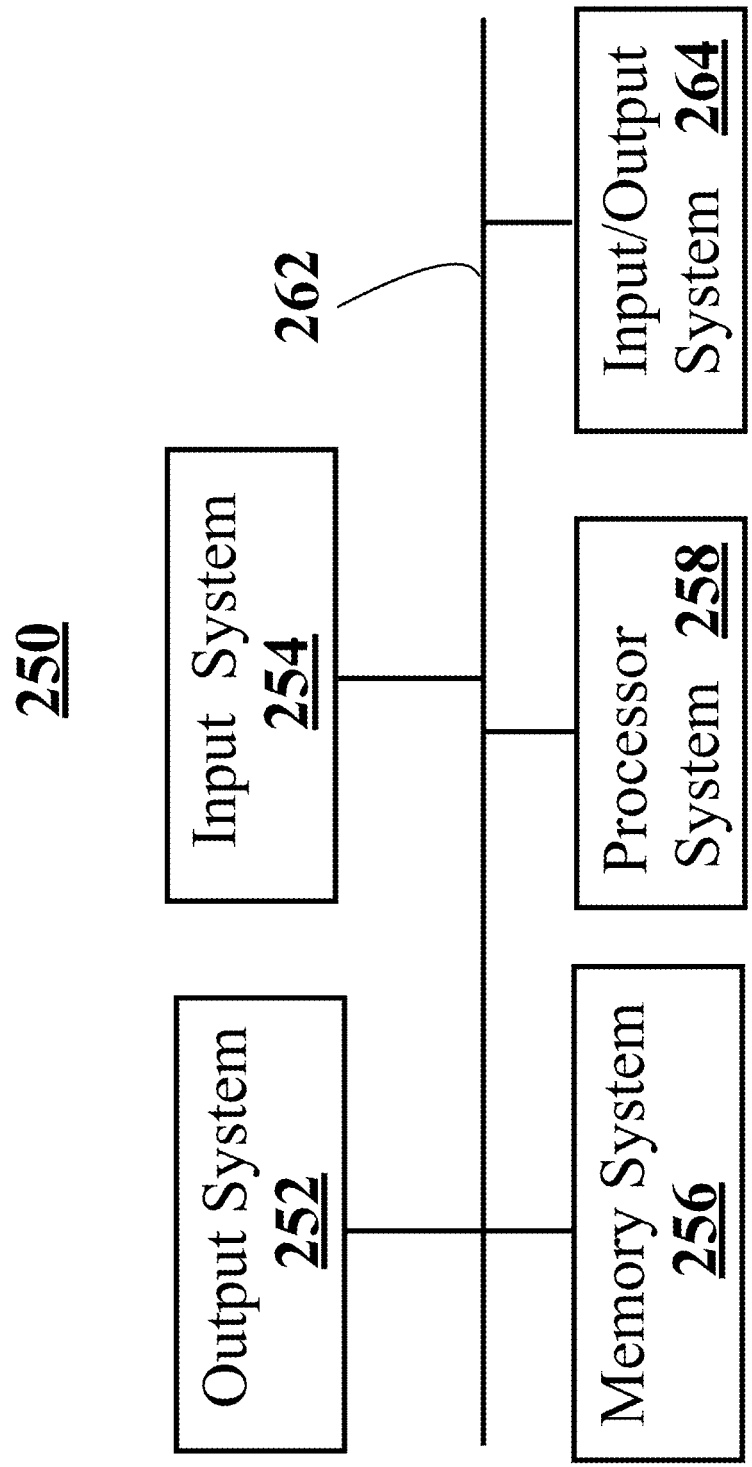

FIG. 2B shows an embodiment of a clock machine hardware architecture, which includes a processor that computes using clock machines, memory and input/output system, which may be using the clock machines of of FIG. 1A and FIG. 1B.

Figure 3:
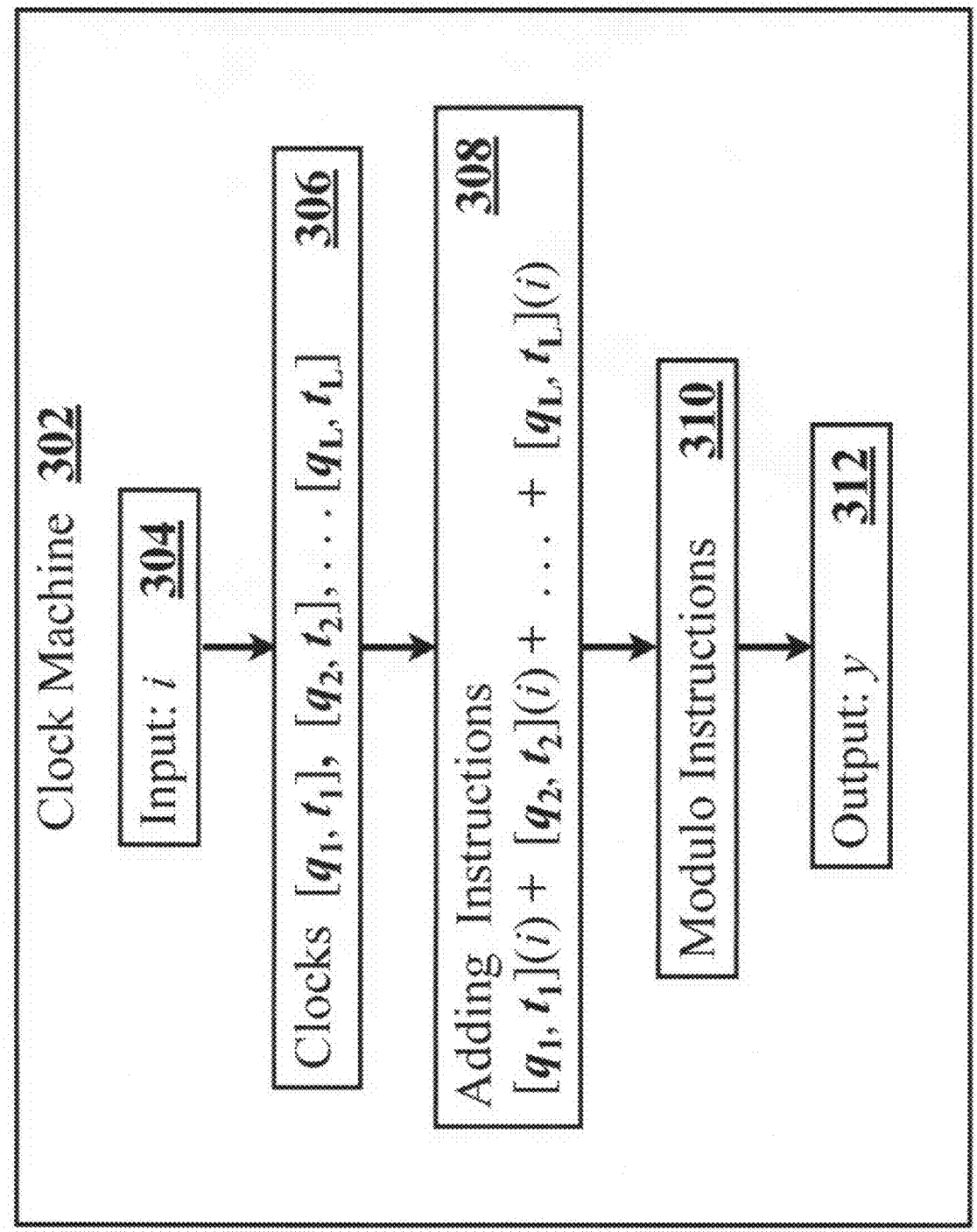

FIG. 3 shows an embodiment of one or more clock machines, combining to implement the sequence of instructions in machine procedures 1, 2, 3 and 4. Procedures 1, 2, 3 and 4 are comprehensively specified in section 6.6, titled CLOCK MACHINE COMPUTATION. In an embodiment, FIG. 3 represents a virtual machine implementation. In another embodiment, FIG. 3 represents a hardware implementation.

Figure 4A:
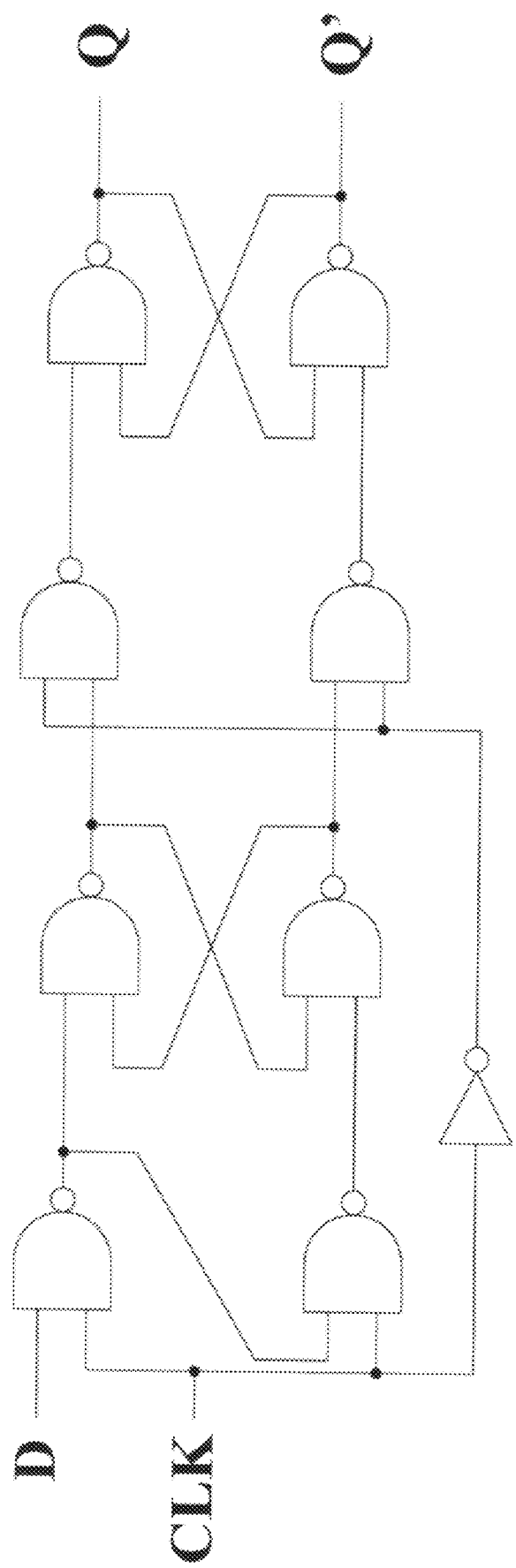

FIG. 4A shows a D-type flip flop (hardware) implemented with NAND gates. Q' equals NOT Q.

Figure 4B:
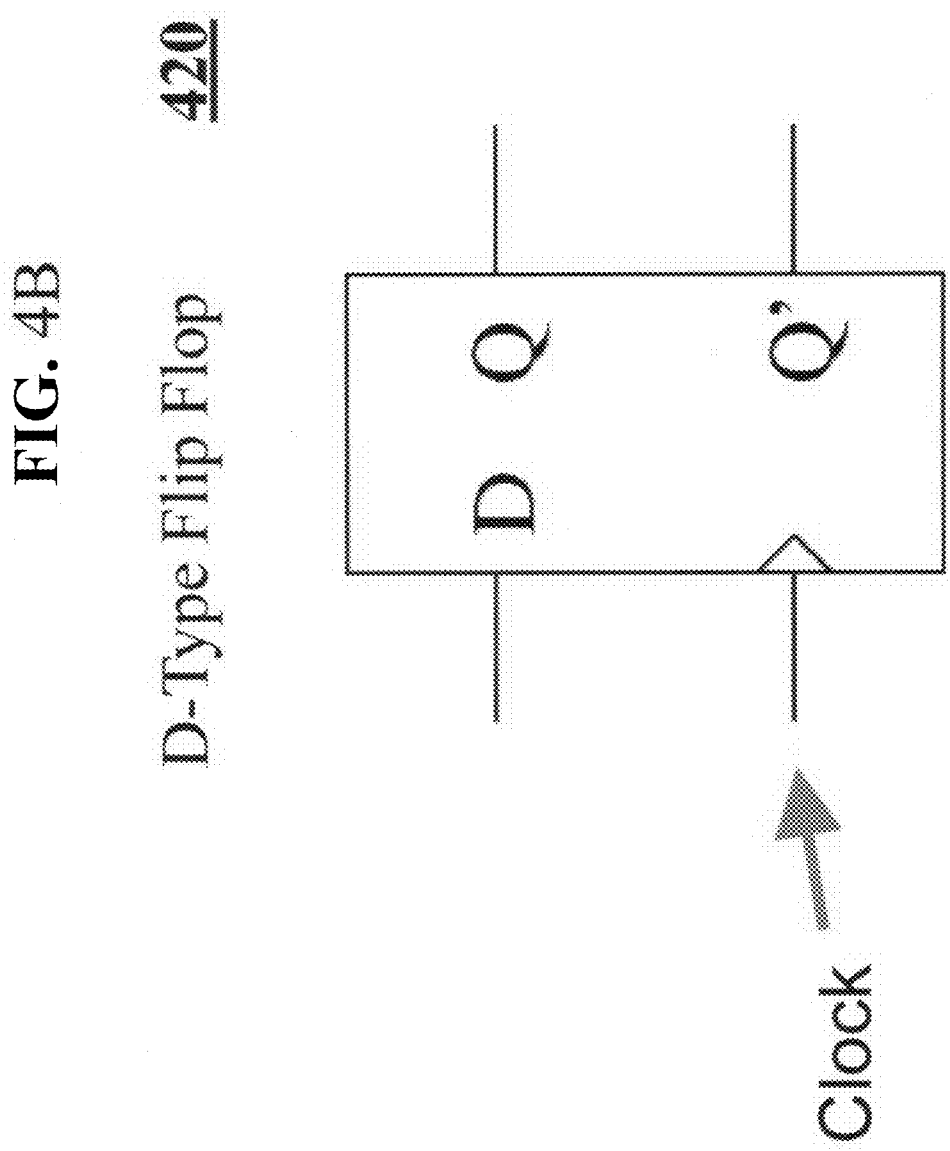

FIG. 4B shows a D-type flip flop (hardware) in a form so that the internal implementation in terms of NAND gates is not shown. This diagram of a D-type flip flop is convenient for representing the D-type flip flop as a building block for clock machines.

FIG. 4C shows a D-type flip flop with the output of Q' feeding back into input D of the flip flop, where Q' is the logical NOT of Q. The waveforms show the behavior of output Q. Output Q flips its state from 0 to 1 or 1 to 0 upon every downward edge of the clock signal, labelled CLK.

FIG. 4D shows a hardware implementation of a [p, 0] clock machine, using two clock signals I and p and a single D-type flip flop that has the same feedback structure as FIG. 4C. p is the amount of time that clock signal stays high before it switches to low (0) for a short period of time, when clock signal I is low. This hardware implementation, using a D-type flip flop is independent of the physical units of time. In a hardware embodiment, clock signal I may have a period of 1 millisecond and so clock signal p has a period of p milliseconds. In an embodiment, clock signal I may have a period of 1 nanosecond and clock signal p has a period of p nanoseconds.

Figure 5A:
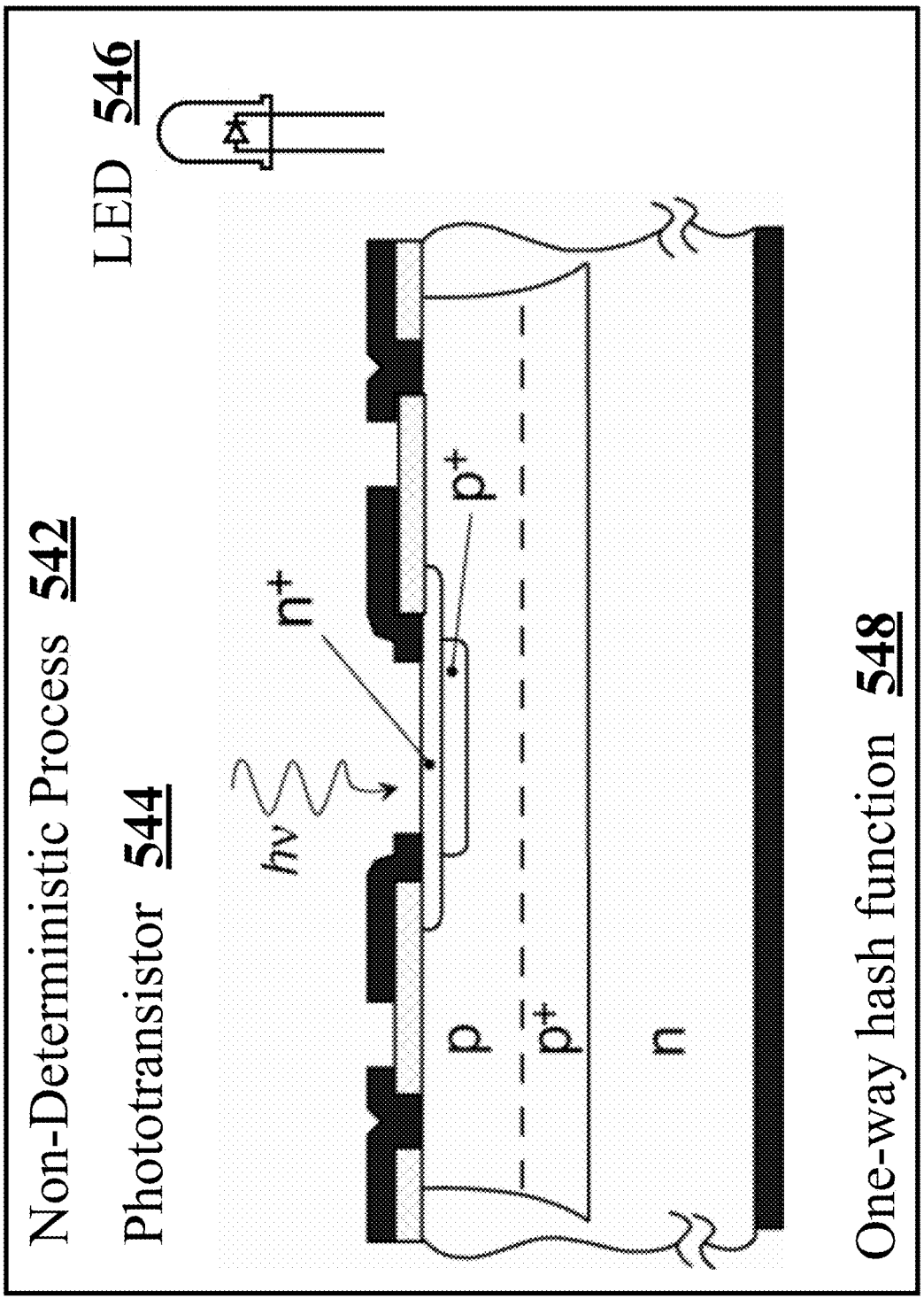

FIG. 5A shows an embodiment of a non-deterministic process, based on quantum randomness. Non-deterministic process 542 is based on the quantum behavior of photons. Non-deterministic process 542 contains a light emitting diode 546 that emits photons and a phototransistor 544 that absorbs photons.

Figure 5B:
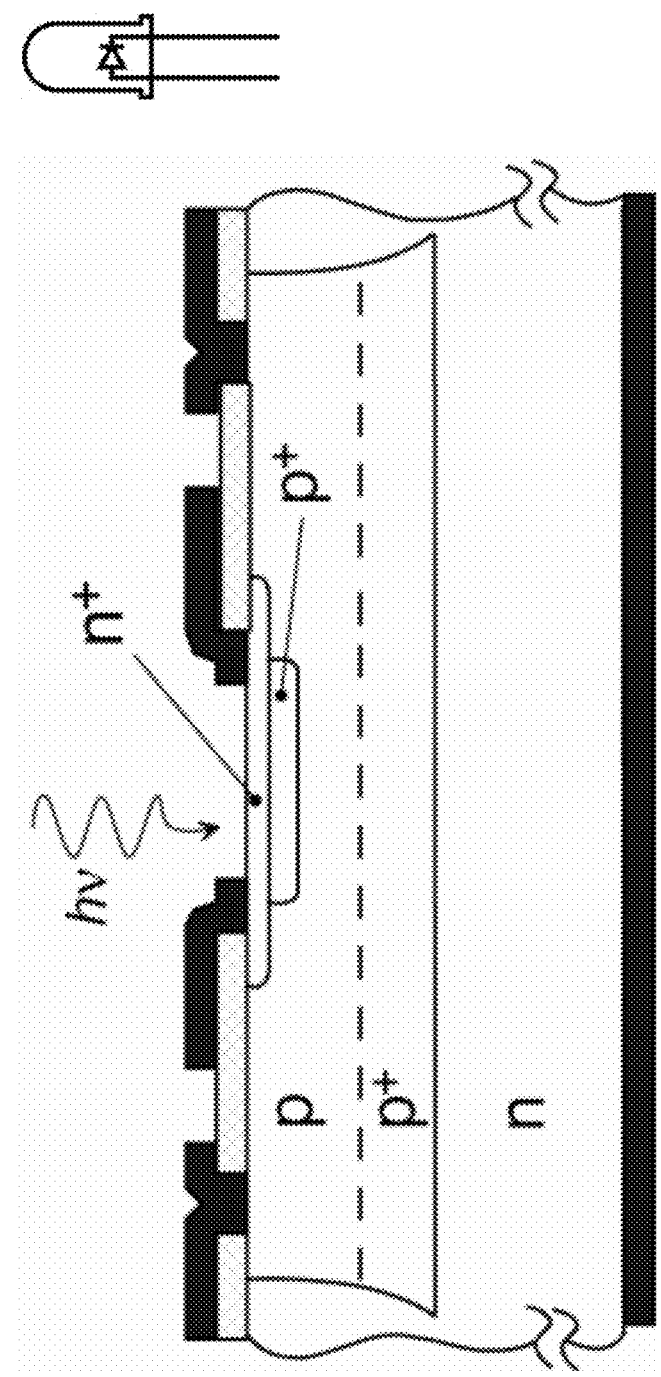

FIG. 5B shows an embodiment of a non-deterministic process, based on quantum randomness. Non-deterministic process 552 is based on the quantum behavior of photons. Non-deterministic process 552 contains a light emitting diode 556 that emits photons and a photodiode 554 that absorbs photons.

FIG. 6 shows a light emitting diode 602, which emits photons and in some embodiments is part of the non-deterministic process. The light emitting diode contains a cathode, a diode, an anode, one terminal pin connected to the cathode and one terminal pin connected to the anode, a p-layer of semiconductor, an active region, an n-layer of semiconductor, a substrate and a transparent plastic case.

FIG. 7 shows some 2-clocks, 3-clocks and some prime clock sums in the abelian group $\mathbb{Z}_2^{\mathbb{N}}$.

FIG. 8 shows some 5-clocks and some 5-clock sums projected into the abelian group $\Omega_2$ that has 2 distinct time states as output.

FIG. 9 shows some prime clocks and their sum in the abelian group $\Omega_5$, which has 5 distinct time states.

FIG. 10 shows all 7-clock machines, projected into abelian group $\Omega_2$.

FIG. 11 shows all 16 Boolean functions $f_k:\{0, 1\}^2 \rightarrow \{0, 1\}$, their respective truth tables and a corresponding prime clock sum machine that implements each of these 16 Boolean functions. These 16 Boolean functions include the standard logic gates such as AND, OR, NOT, NAND, XOR, and NOR. Thus, this truth table demonstrates that prime clock sums can act as computational primitives.

FIG. 12 shows a complete specification of 2-bit multiplication in terms of the 4 Boolean multiplication functions $\mathcal{M}_0:\{0, 1\}^4 \rightarrow \{0, 1\}$, $\mathcal{M}_1:\{0, 1\}^4 \rightarrow \{0, 1\}$, $\mathcal{M}_2\{0, 1\}^4 \rightarrow \{0, 1\}$, and $\mathcal{M}_3:\{0, 1\}^4 \rightarrow \{0, 1\}$.

FIG. 13 shows block size, key size, cell size and number of rounds parameters for two versions of the Midori cipher: Midori 64 and Midori 128.

FIG. 14 shows a complete specification of the Midori 4-bit bijective substitution boxes $S_0$ and $S_1$.

FIG. 15 shows the Midori Round constants.

FIG. 16 shows a specification of the Midori 64 Boolean functions $\pi_0 \circ S_0$, $\pi_1 \circ S_0$, $\pi_2 \circ S_0$, and $\pi_3 \circ S_0$ and corresponding random prime clock sum machines that compute these 4 functions. The random prime clock sum machines were constructed with machine procedure 5.

FIG. 17 shows a specification of the Midori 128 Boolean functions $\pi_0 \circ S_1$, $\pi_1 \circ S_1$, $\pi_2 \circ S_1$, and $\pi_3 \circ S_1$ and corresponding random prime clock sum machines that compute these 4 functions.

FIG. 18 shows CPU time tests on prime clock machines [p, t], where p is prime number in the set {2, 3, 5, 7, 11, 13, 17, 19} and starting time state t satisfies 0≤t<p.

FIG. 19 shows random prime clock sum machines that compute affine maps used by the Midori cipher.

Figure 20:
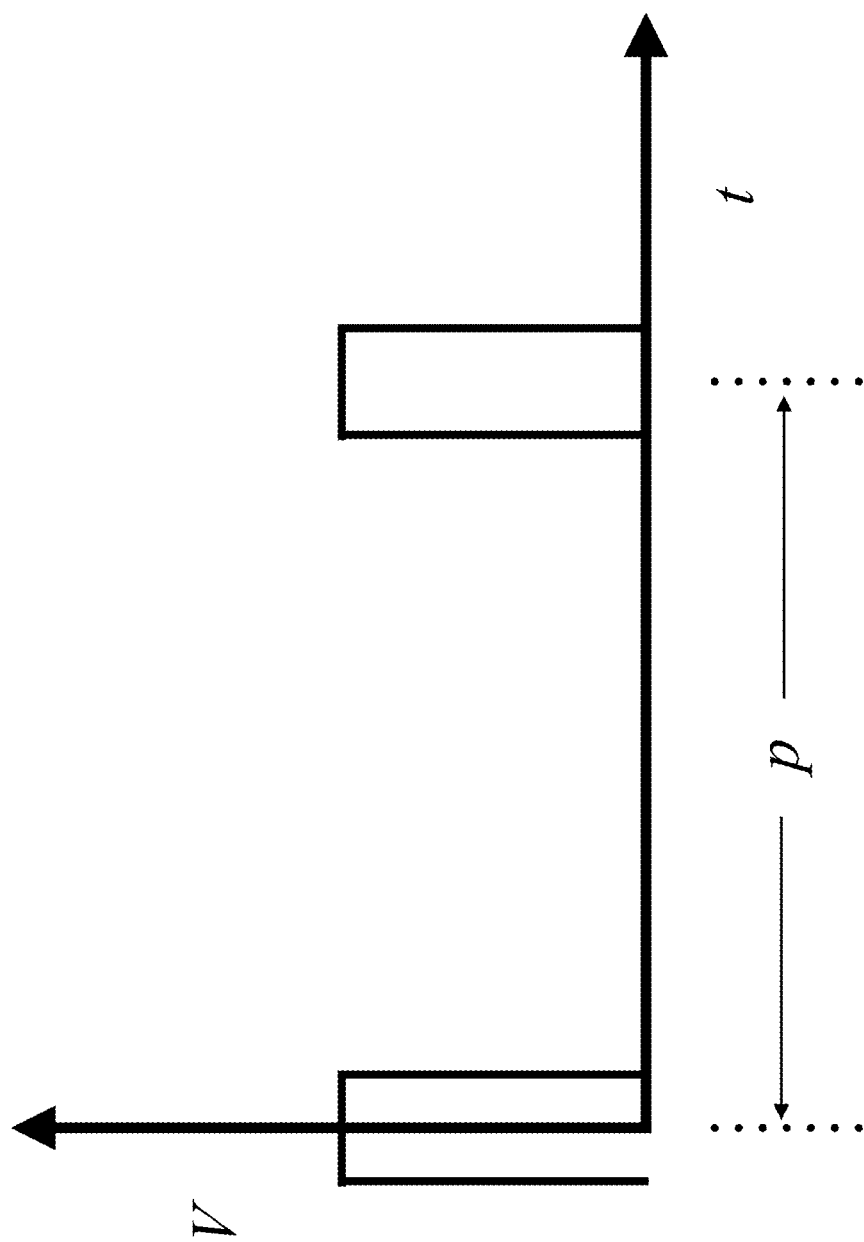

FIG. 20 shows a (p, 0) periodic machine that has period p and generates a pulse at time 0, time p, time 2p, time 3p, and so on. Time state 0 is called the phase of the clock machine. In an embodiment, V is the voltage, and the height of the pulse is measured in volts.

Figure 21:
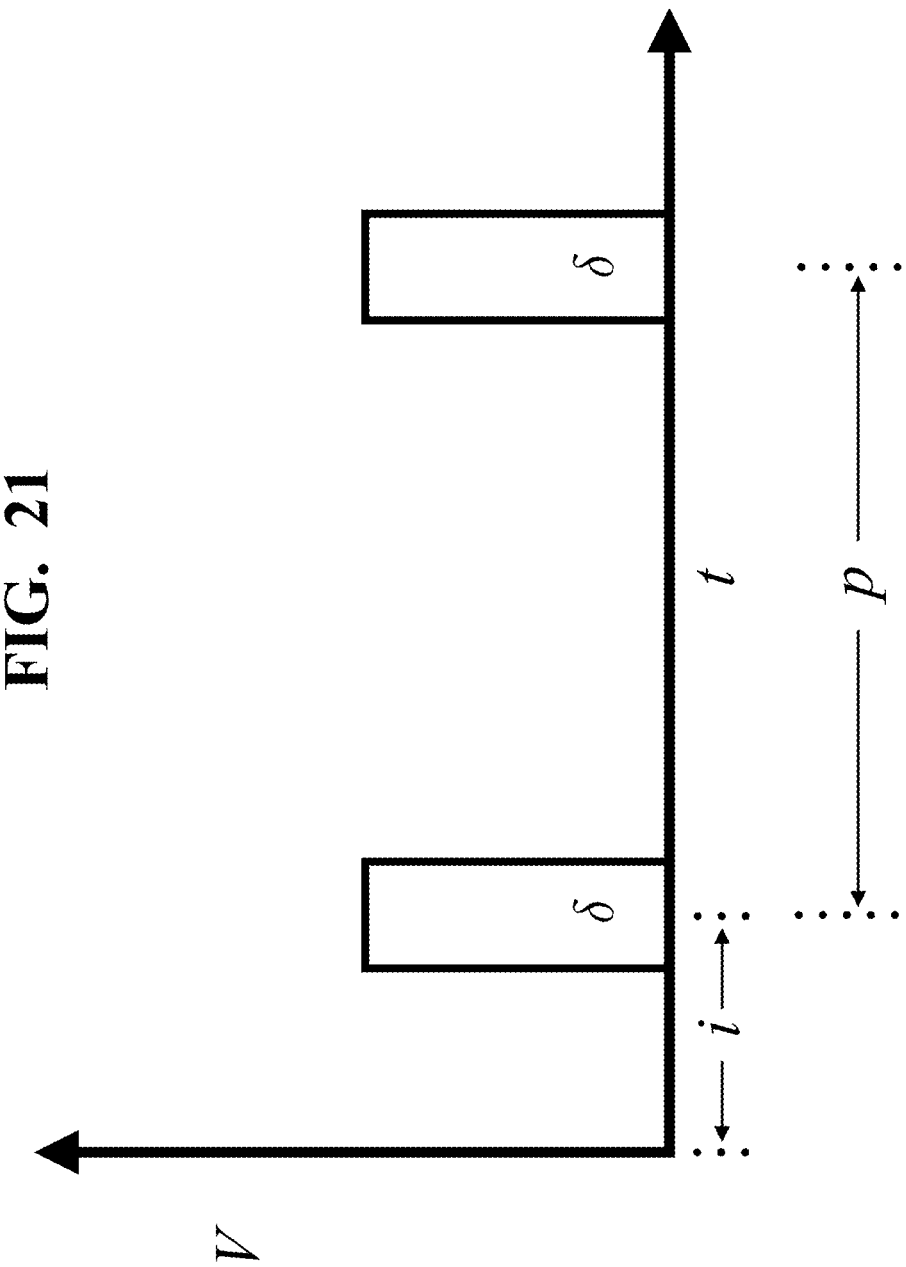

FIG. 21 shows a (p, i) periodic machine that has period p and generates a pulse at time i, time i+p, time i+2p, time i+3p, and so on. Time state i is called the phase of the clock machine. In an embodiment, V is the voltage, and the height of the pulse is measured in volts.

Figure 22:
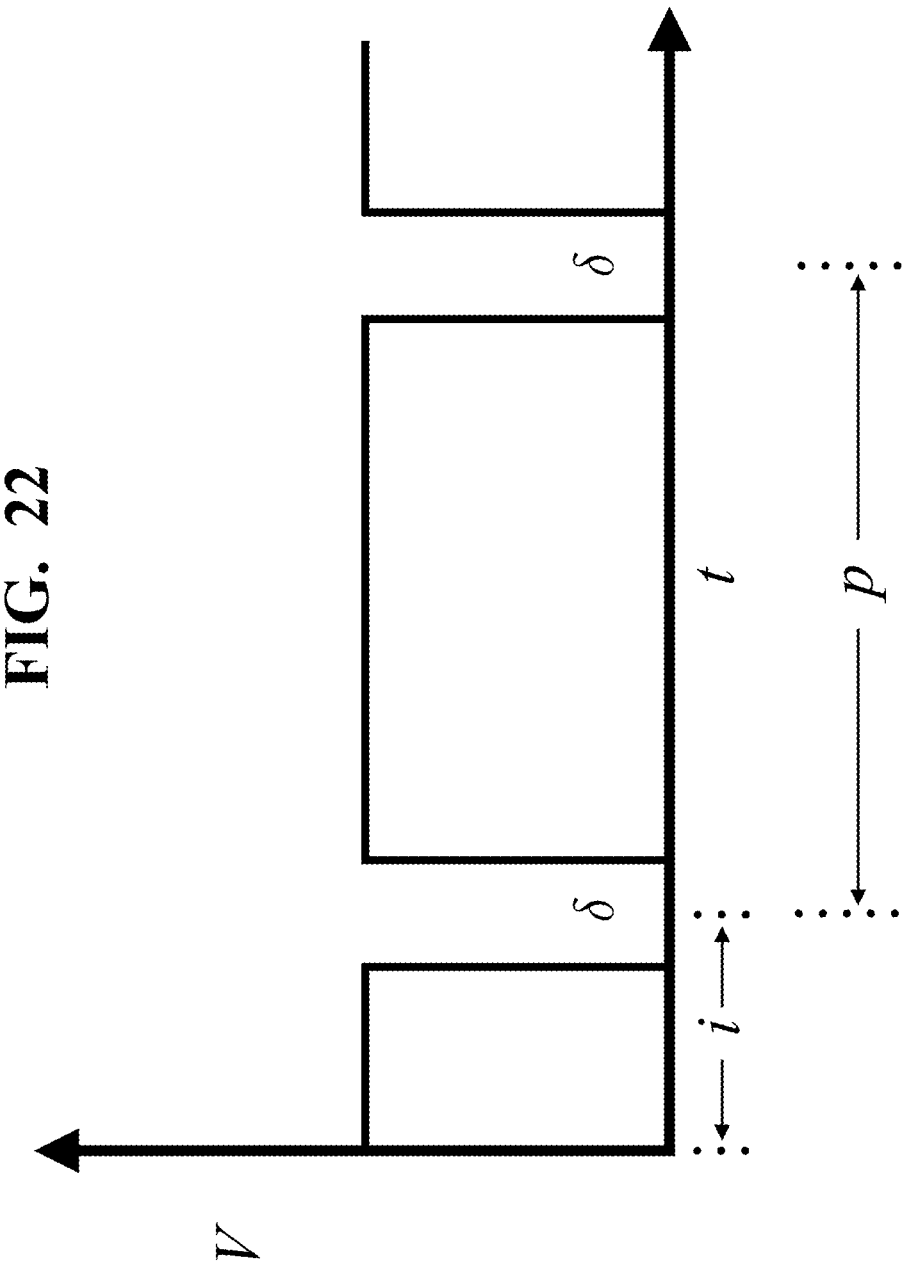

FIG. 22 shows a (p, i) periodic machine that has period p and generates an inverted pulse at time i, time i+p, time i+2p, time i+3p, and so on. Time state i is called the phase of the clock machine. In an embodiment, V is the voltage, and the height of the inverted pulse is measured in volts.

Figure 23:
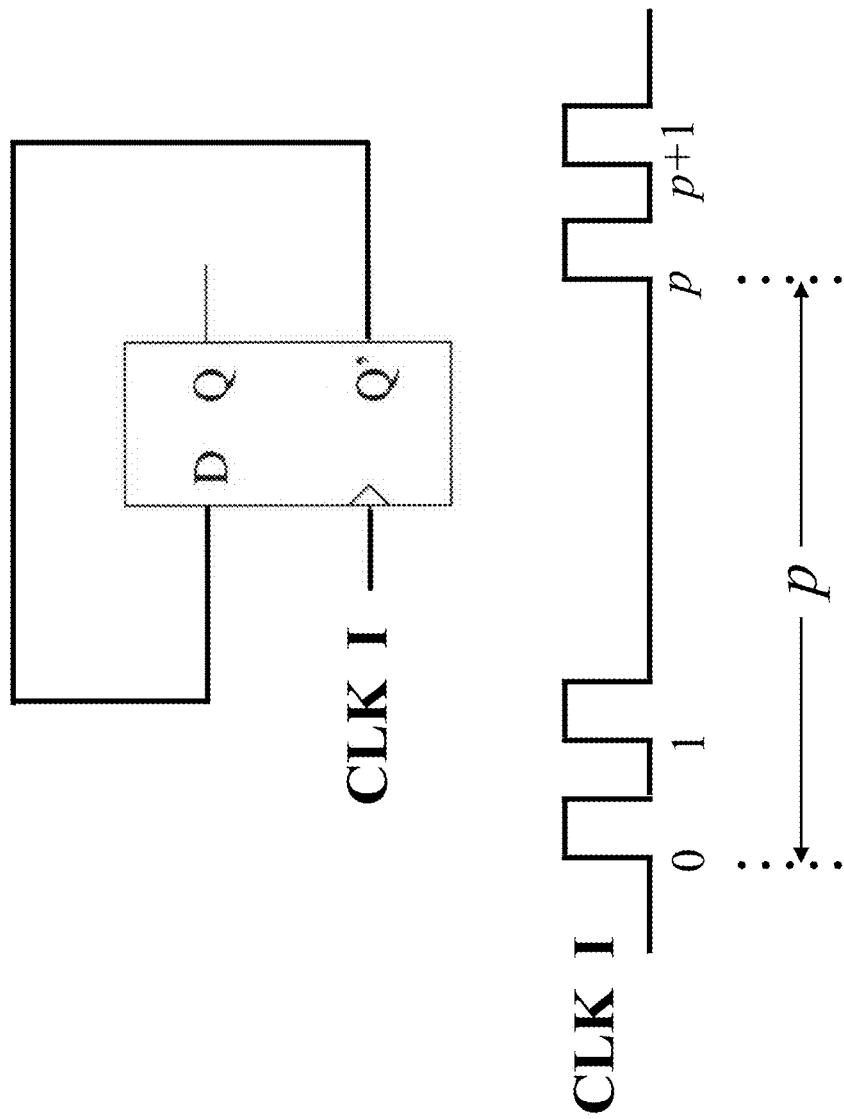

FIG. 23 shows how to build a (p, 1) periodic machine (where i=1 in FIG. 21) from a D flip-flop and a clock input that has two consecutive pulses.

6 DETAILED DESCRIPTION

6.1 Machine Terms and Definitions

In this specification, the term "location" may refer to geographic locations and/or storage locations. A particular storage location may be a collection of contiguous and/or noncontiguous locations on one or more machine readable media. Two different storage locations may refer to two different sets of locations on one or more machine-readable media in which the locations of one set may be intermingled with the locations of the other set.

In this specification, the term "machine-readable medium" refers to any non-transitory medium capable of carrying or conveying information that is readable by a machine. One example of a machine-readable medium is a computer-readable medium. Another example of a machine-readable medium is paper having holes that are detected that trigger different mechanical, electrical, and/or logic responses. The term machine-readable medium also includes media that carry information while the information is in transit from one location to another, such as copper wire and/or optical fiber and/or the atmosphere and/or outer space.

In this specification, the term "process" refers to a series of one or more operations. In an embodiment, "process" may also include operations or effects that are best described as non-deterministic. In an embodiment, "process" may include some operations that can be executed by a digital computer program and some physical effects that are non-deterministic, which cannot be executed by a digital computer program and cannot be performed by a finite sequence of processor instructions.

In this specification, the term "procedure" refers to a sequence of one or more instructions, executed by a machine. A procedure typically is executed by a finite machine that executes a finite number of instructions with finite memory.

In this specification, machine-implemented procedures and processes execute algorithms and combine non-deterministic processes with a machine. The formal notion of "algorithm" was introduced in Turing's work [29] and refers to a finite machine that executes a finite number of instructions with finite memory. In other words, an algorithm can be executed with a finite number of machine instructions on a processor. "Algorithm" is a deterministic process in the following sense: if the finite machine is completely known and the input to the machine is known, then the future behavior of the machine can be determined. In contrast, there is hardware that can measure quantum effects from photons (or other physically non-deterministic processes), whose physical process is non-deterministic. The recognition of non-determinism produced by quantum randomness and other quantum embodiments is based on decades of experimental evidence and statistical testing. Furthermore, the quantum theory—derived from the Kochen-Specker theorem and its extensions [19, 8]—predicts that the outcome of a quantum measurement cannot be known in advance and cannot be generated by a Turing machine (digital computer program). As a consequence, a physically non-deterministic process cannot be generated by an algorithm: namely, a sequence of operations executed by a digital computer program. FIG. 5A and FIG. 5B show embodiments of a non-deterministic process arising from quantum events; that is, the emission and absorption of photons.

Some examples of physically non-deterministic processes are as follows. In some embodiments that utilize non-determinism, photons strike a semitransparent mirror and can take two or more paths in space. In one embodiment, if the photon is reflected by the semitransparent mirror, then it takes on one bit value b∈{0, 1}; if the photon passes through by the semitransparent mirror, then the non-deterministic process produces another bit value 1−b. In another embodiment, the spin of an electron may be sampled to generate the next non-deterministic bit. In still another embodiment, a protein, composed of amino acids, spanning a cell membrane or artificial membrane, that has two or more conformations can be used to detect non-determinism: the protein conformation sampled may be used to generate a non-deterministic value in {0, . . . n−1} where the protein has n distinct conformations. In an alternative embodiment, one or more rhodopsin proteins could be used to detect the arrival times of photons and the differences of arrival times could generate non-deterministic bits. In some embodiments, a Geiger counter may be used to sample non-determinism.

In this specification, the term "photodetector" refers to any type of device or physical object that detects or absorbs photons. A photodiode is an embodiment of a photodetector. A phototransistor is an embodiment of a photodetector. A rhodopsin protein is an embodiment of a photodetector.

6.2 Non-Deterministic Processes

FIG. 5A shows an embodiment of a non-deterministic process 542 arising from quantum events: that is, non-deterministic process 542 uses the emission and absorption of photons for its non-determinism. In FIG. 5A, phototransistor 544 absorbs photons emitted from light emitting diode 546. In an embodiment, the photons are produced by a light emitting diode 546. In FIG. 5B, non-deterministic process 552 has a photodiode 554 that absorbs photons emitted from light emitting diode 556. In an embodiment, the photons are produced by a light emitting diode 556.

FIG. 6 shows a light emitting diode (LED) 602. In an embodiment, LED 602 emits photons and is part of the non-deterministic process 542 (FIG. 5A). In an embodiment, LED 602 emits photons and is part of the non-deterministic process 552 (FIG. 5B). LED 602 contains a cathode, a diode, an anode, one terminal pin connected to the cathode and one terminal pin connected to the anode, a p-layer of semiconductor, an active region, an n-layer of semiconductor, a substrate and a transparent plastic case. The plastic case is transparent so that a photodetector outside the LED case can detect the arrival times of photons emitted by the LED. In an embodiment, photodiode 544 absorbs photons emitted by LED 602. In an embodiment, phototransistor 554 absorbs photons emitted by LED 602.

The emission times of the photons emitted by the LED experimentally obey the energy-time form of the Heisenberg uncertainty principle. The energy-time form of the Heisenberg uncertainty principle contributes to the non-determinism of non-deterministic process 542 or 552 because the photon emission times are unpredictable due to the uncertainty principle. In FIG. 5A and FIG. 5B, the arrival of photons are indicated by a squiggly curve with an arrow and hv next to the curve. The detection of arrival times of photons is a non-deterministic process. Due to the uncertainty of photon emission, the arrival times of photons are quantum events.

In FIG. 5A and FIG. 5B, hv refers to the energy of a photon that arrives at photodiode 544, respectively, where h is Planck's constant and v is the frequency of the photon. In FIG. 5A, the p and n semiconductor layers are a part of a phototransistor 544, which generates and amplifies electrical current, when the light that is absorbed by the phototransistor. In FIG. 5B, the p and n semiconductor layers are a part of a photodiode 554, which absorbs photons that strike the photodiode.

A photodiode is a semiconductor device that converts light (photons) into electrical current, which is called a photocurrent. The photocurrent is generated when photons are absorbed in the photodiode. Photodiodes are similar to standard semiconductor diodes except that they may be either exposed or packaged with a window or optical fiber connection to allow light (photons) to reach the sensitive part of the device. A photodiode may use a PIN junction or a p-n junction to generate electrical current from the absorption of photons. In some embodiments, the photodiode may be a phototransistor.

A phototransistor is a semiconductor device comprised of three electrodes that are part of a bipolar junction transistor. Light or ultraviolet light activates this bipolar junction transistor. Illumination of the base generates carriers which supply the base signal while the base electrode is left floating. The emitter junction constitutes a diode, and transistor action amplifies the incident light inducing a signal current.

When one or more photons with high enough energy strikes the photodiode, it creates an electron-hole pair. This phenomena is a type of photoelectric effect. If the absorption occurs in the junction's depletion region, or one diffusion length away from the depletion region, these carriers (electron-hole pair) are attracted from the PIN or p-n junction by the built-in electric field of the depletion region. The electric field causes holes to move toward the anode, and electrons to move toward the cathode; the movement of the holes and electrons creates a photocurrent. In some embodiments, the amount of photocurrent is an analog value, which can be digitized by a analog-to-digital converter. In some embodiments, the analog value is amplified before being digitized.

In an embodiment, the sampling of the digitized photocurrent values may converted to threshold times as follows. A photocurrent threshold $\theta$ is selected as a sampling parameter. If a digitized photocurrent value $i_1$ is above $\theta$ at time $t_1$, then $t_1$ is recorded as a threshold time. If the next digitized photocurrent value $i_2$ above $\theta$ occurs at time $t_2$, then $t_2$ is recorded as the next threshold time. If the next digitized value $i_3$ above $\theta$ occurs at time $t_3$, then $t_3$ is recorded as the next threshold time.

After three consecutive threshold times are recorded, these three times can determine a bit value as follows. If $t_2-t_1 > t_3-t_2$, then the non-deterministic process produces a 1 bit. If $t_2-t_1 < t_3-t_2$, then the non-deterministic process produces a 0 bit. If $t_2-t_1 = t_3-t_2$, then NO bit information is produced. To generate the next bit, non-deterministic process 542 or 552 continues the same sampling steps as before and three new threshold times are produced and compared.

In an alternative sampling method, a sample mean $\mu$ is established for the photocurrent, when it is illuminated with photons. In some embodiments, the sampling method is implemented as follows. Let $i_1$ be the photocurrent value sampled at the first sampling time. $i_1$ is compared to $\mu$. $\epsilon$ is selected as a parameter in the sampling method that is much smaller number than $\mu$. If it is greater than $\mu+\epsilon$, then a 1 bit is produced by the non-deterministic process 542 or 552. If $i_1$ is less than $\mu-\epsilon$, then a 0 bit is produced by non-deterministic process 542 or 552. If it is in the interval $[\mu-\epsilon, \mu+\epsilon]$, then NO bit is produced by non-deterministic process 542 or 552.

Let $i_2$ be the photocurrent value sampled at the next sampling time. $i_2$ is compared to $\mu$. If $i_2$ is greater than $\mu+\epsilon$, then a 1 bit is produced by the non-deterministic process 542 or 552. If $i_2$ is less than $\mu-\epsilon$, then a 0 bit is produced by the non-deterministic process 542 or 552. If $i_2$ is in the interval $[\mu-\epsilon, \mu+\epsilon]$, then NO bit is produced by the non-deterministic process 542 or 552. This alternative sampling method continues in the same way with photocurrent values $i_3$, $i_4$, and so on. In some embodiments, the parameter $\epsilon$ is selected as zero instead of a small positive number relative to $\mu$.

Some alternative hardware embodiments of a non-deterministic process are described below. In some embodiments that utilize non-determinism to produce random clock machines, a semitransparent mirror may be used. In some embodiments, the mirror contains quartz (glass). The photons that hit the mirror may take two or more paths in space. In one embodiment, if the photon is reflected, then the non-deterministic process creates the bit value $b \in \{0, 1\}$; if the photon is transmitted, then the non-deterministic process creates the other bit value $1-b$. In another embodiment, the spin of an electron may be sampled to generate the next non-deterministic bit. In still another embodiment of generating random clock machines, a protein, composed of amino acids, spanning a cell membrane or artificial membrane, that has two or more conformations can be used to detect non-determinism: the protein conformation sampled may be used to generate a value in $\{0, \ldots n-1\}$ where the protein has n distinct conformations. In an alternative embodiment, one or more rhodopsin proteins could be used to detect the arrival times $t_1 < t_2 < t_3$ of photons and the differences of arrival times ($t_2-t_1 > t_3-t_2$ versus $t_2-t_1 < t_3-t_2$) could generate non-deterministic bits that produce random values.

In some embodiments, the seek time of a hard drive can be used as random values as the air turbulence in the hard drive affects the seek time in a non-deterministic manner. In some embodiments, local atmospheric noise can be used as a source of random values. For example, the air pressure, the humidity or the wind direction could be used. In other embodiments, the local sampling of smells based on particular molecules could also be used as a source of non-determinism.

In some embodiments, a Geiger counter may be used to sample non-determinism and generate random values. In these embodiments, the unpredictability is due to radioactive decay rather than photon emission, arrivals and detection.

6.3 One-Way Hash Functions

A one-way hash function $\Phi$, has the property that given an output value z, it is computationally intractable to find an information element $m_z$ such that $\Phi(m_z)=z$. In other words, a one-way function $\Phi$ is a function that can be easily computed, but that its inverse $\Phi^{-1}$ is computationally intractable to compute [9]. A computation that takes $10^{101}$ computational steps is considered to have computational intractability of $10^{101}$.

More details are provided on computationally intractable. In an embodiment, there is an amount of time T that encrypted information must stay secret. If encrypted information has no economic value or strategic value after time T, then computationally intractable means that the number of computational steps required by all the world's computing power will take more time to compute than time T. Let C(t) denote all the world's computing power at the time t in years.

Consider an online bank transaction that encrypts the transaction details of that transaction. Then in most embodiments, the number of computational steps that can be computed by all the world's computers for the next 30 years is in many embodiments likely to be computationally intractable as that particular bank account is likely to no longer exist in 30 years or have a very different authentication interface.

To make the numbers more concrete, the 2013 Chinese supercomputer that broke the world's computational speed record computes about 33,000 trillion calculations per second [12]. If T=1 one year and we can assume that there are at most 1 billion of these supercomputers. (This can be inferred from economic considerations, based on a far too low 1 million dollar price for each supercomputer. Then these 1 billion supercomputers would cost 1,000 trillion dollars). Thus, C(2014)×1 year is less than $10^9 \times 33 \times 10^{15} \times 3600 \times 24 \times 365 = 1.04 \times 10^{33}$ computational steps.

As just discussed, in some embodiments and applications, computationally intractable may be measured in terms of how much the encrypted information is worth in economic value and what is the current cost of the computing power needed to decrypt that encrypted information. In other embodiments, economic computational intractability may be useless. For example, suppose a fusion power plant wants to keep its codes and infrastructure unbreakable to cyber terrorists. Suppose T=2000 years because it is about twice the expected lifetime of the power plant. Then 2000 years× C(4017) is a better measure of computationally intractable for this application. In other words, for critical applications that are beyond an economic value, one should strive for a good estimate of the world's computing power.

One-way functions that exhibit completeness and a good avalanche effect or the strict avalanche criterion [32] are preferable embodiments: these properties are favorable for one-way hash functions. The definition of completeness and a good avalanche effect are quoted directly from [32]:

If a cryptographic transformation is complete, then each ciphertext bit must depend on all of the plaintext bits. Thus, if it were possible to find the simplest Boolean expression for each ciphertext bit in terms of plaintext bits, each of those expressions would have to contain all of the plaintext bits if the function was complete. Alternatively, if there is at least one pair of n-bit plaintext vectors X and $X_i$ that differ only in bit i, and $f(X)$ and $f(X_i)$ differ at least in bit j for all $\{(i, j): 1 \le i, j \le n\}$, the function $f$ must be complete.

For a given transformation to exhibit the avalanche effect, an average of one half of the output bits should change whenever a single input bit is complemented. In order to determine whether a m×n (m input bits and n output bits) function $f$ satisfies this requirement, the $2^m$ plaintext vectors must be divided into $2^{m-1}$ pairs, X and $X_j$ such that X and $X_j$ differ only in bit i. Then the $2^{m-1}$ exclusive-or sums $V_i = f(X) \ne f(X_i)$ must be calculated. These exclusive-or sums will be referred to as avalanche vectors, each of which contains n bits, or avalanche variables.

If this procedure is repeated for all i such that $1 \le i \le m$ and one half of the avalanche variables are equal to 1 for each i, then the function $f$ has a good avalanche effect. Of course this method can be pursued only if m is fairly small; otherwise, the number of plaintext vectors becomes too large. If that is the case then the best that can be done is to take a random sample of plaintext vectors X, and for each value i calculate all avalanche vectors $V_i$. If approximately one half the resulting avalanche variables are equal to 1 for values of i, then we can conclude that the function has a good avalanche effect.

A hash function, also denoted as $\Phi$, is a function that accepts as its input argument an arbitrarily long string of bits (or bytes) and produces a fixed-size output of information. The information in the output is typically called a message digest or digital fingerprint. In other words, a hash function maps a variable length m of input information to a fixed-sized output, $\Phi(m)$, which is the message digest or information digest. Typical output sizes range from 160 to 512 bits, but can also be larger. An ideal hash function is a function $\Phi$, whose output is uniformly distributed in the following way: Suppose the output size of $\Phi$ is n bits. If the message m is chosen randomly, then for each of the $2^n$ possible outputs z, the probability that $\Phi(m)=z$ is $2^{-n}$. In an embodiment, the hash functions that are used are one-way.

A good one-way hash function is also collision resistant. A collision occurs when two distinct information elements are mapped by the one-way hash function $\Phi$ to the same digest. Collision resistant means it is computationally intractable for an adversary to find collisions: more precisely, it is computationally intractable to find two distinct information elements $m_1, m_2$ where $m_1 \ne m_2$ and such that $\Phi(m_1)=\Phi(m_2)$.

A number of one-way hash functions may be used to implement one-way hash function 148. In an embodiment, SHA-512 can implement one-way hash function 148, designed by the NSA and standardized by NIST [25]. The message digest size of SHA-512 is 512 bits. Other alternative hash functions are of the type that conform with the standard SHA-384, which produces a message digest size of 384 bits. SHA-1 has a message digest size of 160 bits. An embodiment of a one-way hash function 148 is Keccak [6]. An embodiment of a one-way hash function 148 is BLAKE [2]. An embodiment of a one-way hash function 148 is Grøstl [13]. An embodiment of a one-way hash function 148 is JH [33]. Another embodiment of a one-way hash function is Skein [11].

6.4 Symbol Meanings and Machine Notation

The symbol $\neg$ represents the unary NOT gate. $\neg(0)=1$ and $\neg(1)=0$. The symbol $\vee$ represents the binary OR gate. $0 \vee 0=0$ and $0 \vee 1=1 \vee 0=1 \vee 1=1$. The binary AND gate is represented with ∧. 1 ∧1=1 and 0∧1=1∧0=0∧0=0. In the prior art, gates are typically implemented with transistors.

A bit has two states 0 or 1. In some embodiments, a bit is represented with voltage. In another embodiment, a bit may be represented with the polarization of a photon. The expression $\{0, 1\}^n$ represents the set of all n-bit strings. There are $2^n$ different n-bit strings. The expression $\{0, 1\}^4$ represents the all 4-bit strings. 0101 is a 4-bit string. There are 16 different 4-bit strings Symbol $\mathbb{Z}$ denotes the integers and $\mathbb{N}$ the non-negative integers. For any $n \in \mathbb{N}$ such that $n \geq 2$ and $a \in \mathbb{N}$ such that $0 \leq a \leq n-1$, consider the equivalence class $[a]\{a+kn: k \in \mathbb{Z}\}$ that is a subset of $\mathbb{Z}$. Let $\mathbb{Z}_n = \{[0], [1], \ldots, [n-1]\}$. mod is the modulo function and a mod n is the remainder when a is divided by n. In the standard manner, $(\mathbb{Z}_n, +_n)$ is an abelian group, where binary operator $+_n$ is defined as $[a]+_n[b]=[(a+b) \bmod n]$. For clarity, the brackets are sometimes omitted and $[a] \in \mathbb{Z}_n$ is represented with the integer a, satisfying $0 \leq a \leq n-1$. The field $\mathbb{F}_2$ is the two elements $\{0, 1\}$, where + is addition modulo 2 and multiplication * is equal to ∧ (AND).

The least common multiple of positive integers a and b is 1 cm(a, b). The greatest common divisor of a and b is gcd(a, b). Let $p_1=2$, $p_2=3$, $p_3=5$, $p_4=7$ . . . where the nth prime number is $p_n$. Let p be an odd prime. p is called a 3 mod 4 prime if $$\frac{p-1}{2}$$

is odd. p is called a 1 mod 4 prime if $$\frac{p-1}{2}$$

is even. $\log_2(n)$ is the logarithm base 2 of n. $\lceil x \rceil$=the smallest integer l such that $l \geq x$.

6.5 Clock Machine Specifications

This section provides specifications and procedures related to prime clocks executing in one or more prime clock machines.

Machine Specification 1. Prime Clock Machine

Let p be a prime number. Let $t \in \mathbb{N}$ such that $0 \leq t \leq p-1$. Define prime clock machine $[p, t]: \mathbb{N} \to \mathbb{N}$ as $[p, t](m)=(m+t) \bmod p$. Prime clock machine $[p, t]$ is called a p-clock machine and is a computational machine that starts ticking (i.e., starts changing its time state) with its hand pointing to t; this is another of saying that its time state starts at t. The number p is the total number of time states that the clock $[p, t]$ has.

In some embodiments, p is a composite number. Herein the expression clock $[p, s]$ always assumes that the starting time state s satisfies $0 \leq s \leq p-1$. Thus, if $p \neq q$ or $s \neq t$, then prime clock $[p, s]$ is not equal to prime clock $[q, t]$; equivalently, if $p=q$ and $s=t$, then $[p, s]=[q, t]$. If $p \neq q$, the clock $[p, s]$ has a different number of time states than clock $[q, t]$. If $s \neq t$, the clock $[p, s]$ has a different starting time state than clock $[q, t]$.

In machine specification 1, the phrase clock machine was chosen because p-clock machines have some similarities to traditional 12-clocks common in some homes. It is important to recognize that clock machine $[p, t]$ is a computational machine that has different physical instantiations, depending on the hardware or software embodiment.

In some software embodiments, the clock machine is a virtual machine. A virtual machine means the clock machine may be implemented in C source code or Python source code or another suitable programming language. The source code implementation of the clock machine is compiled to execute on a standard operating system such was Windows, Linux, or Apple OS.

A clock machine should not be confused with a CPU clock that is built from transistor gates and uses a crystal to provide the voltage oscillations and voltage changes in the transistor gates.

Another notable difference is that CPU clocks typically tick based on a power of 2; that is, $2^n$ where n is a positive integer. Clock machines tick (i.e., changes its time state) usually based on clocks that use prime numbers as the number of states in the clock. In a 7-clock, the prime clock machine ticks based on 7 distinct states $\{0, 1, 2, 3, 4, 5, 6\}$ before it repeats. FIG. 10 shows some different 7-clock machines.

For the nth prime $p_n$, let $\mathcal{P}_n\{[p_n, 0], [p_n, 1], \ldots, [p_n, p_n-1]\}$ be the distinct $p_n$-clocks. The collection of all prime clocks is defined as $$\mathcal{P} = \bigcup_{n=1}^{\infty} \mathcal{P}_n \tag{6.1}$$

For $n \geq 2$, let $\Omega_n = \mathbb{Z}_n^{\mathbb{N}}$. Define $\Pi_n: \mathcal{P} \to \Omega_n$ as the projection of each p-clock machine into $\Omega_n$ where $\Pi_n([p, t](m)) = [p, t](m) \bmod n$.

Machine Specification 2.

Let $n \in \mathbb{N}$ such that $n \geq 2$. On the collection $\mathcal{P}$ of clock machines, define the binary operator machine $\oplus_n$ as $([p, s] \oplus_n [q, t])(m) = ([p, s](m) + [q, t](m)) \bmod n$, where + is computed in $\mathbb{Z}$. Observe that the prime clock machine $[p, s] \oplus_n [q, t]$ computes in $\Omega_n$.

Machine Specification 3. Finite Prime Clock Sum Machine

Similarly, with prime clock machines $[q_1, t_1], [q_2, t_2] \ldots$ and $[q_L, t_L]$, a new machine $[q_1, t_1] \oplus_n [q_2, t_2] \ldots \oplus_n [q_L, t_L]$: $\mathbb{N} \to \mathbb{Z}_n$ can be constructed. From a mathematics perspective of how the machine behaves, $[q_1, t_1] \oplus_n [q_2, t_2] \ldots \oplus_n + [q_L, t_L]$ is sometimes called a function. For each $m \in \mathbb{N}$, define $([q_1, t_1] \oplus_n [q_2, t_2] \oplus_n \ldots \oplus_n [q_L, t_L])(m) = ([q_1, t_1](m) + [q_2, t_2](m) + \ldots + [q_L, t_L](m)) \bmod n$, where + is computed in $\mathbb{Z}$. $[q_1, t_1] \oplus_n [q_2, t_2] \ldots \oplus_n + [q_L, t_L]$ is called a finite prime clock sum machine in $\Omega_n$.

In some embodiments, the binary operation machine $\oplus_n$ builds prime clock sum machines from prime clock machines (i.e., 306 of FIG. 3) that are executed natively in hardware. The computational operation $\oplus_n$ is shown in adding instructions 308 of FIG. 3. A useful way to think about the $\oplus_n$ operation is that it combines the outputs of one or more (i.e., $L \geq 1$) clock machines $[q_1, t_1], [q_2, t_2], \ldots [q_L, t_L]$.

In FIG. 3, modulo instructions 310 refer to the modulo operation $(t_k+i) \bmod q_k$, represented by symbols $[q_k, t_k](i)$. In machine specification 3, modulo instructions 310 of FIG. 3, refer to the modulo operation $(t_k+m) \bmod q_k$, for each $1 \leq k \leq L$ and the operator mod n, applied to the sum $([q_1, t_1](m) + [q_2, t_2](m) + \ldots + [q_L, t_L](m))$.

In some hardware embodiments, the hardware uses semiconductor materials such as silicon and doping elements such as boron (3 valence electrons) and phosphorus (5 valence electrons). In some embodiments, these semiconductor materials be used to implement transistors that act as components in a flip flop. In some embodiments, these semiconductor materials are used to build D-type flip flops. A D-type flip flop is shown in FIGS. 4A, 4B, 4C and 4D.

FIG. 4D shows a hardware implementation of a [p, 0] clock machine, using two clock signals I and P and a single D-type flip flop that has the same feedback structure as FIG. 4C. p is the amount of time that clock signal stays high before it switches to low (0) for a short period of time, when clock signal I is low. This hardware implementation, using a D-type flip flop is independent of the physical units of time. In a hardware embodiment, clock signal I may have a period of 1 millisecond and so clock signal P has a period of p milliseconds. In another embodiment, clock signal I may have a period of 1 nanosecond and clock signal P has a period of p nanoseconds.

In FIG. 4D, the waveform for clock signal I. At the beginning of this waveform, $t_0$ is the time when the clock signal I starts to rise from low (0) to high (1). The time δ is the amount of time after $t_0$ that the clock signal I first becomes high. The wavelength time $\lambda = t_{i+1} - t_i$. For example, $\lambda = t_1 - t_0$. In other words, λ is the amount of time between consecutive pulses, coming from the clock signal I.

In FIG. 4D, the waveform for clock signal P is below the waveform for clock signal I. The waveform for clock signal P also starts to rise from low to high at time $t_0$. However, after the waveform for clock signal P first reaches high, it stays high for a time of pλ−2δ. This is so that via the AND gate with inputs of clock signal I and clock signal P, the clock signal I toggles the output Q between low and high during a duration of time equal to λ. The clock signal from P starts to decrease from high to low at time $t_p - \delta$; clock signal from P first reaches a low state again at time $t_p$. The clock signal from P stays low until time $t_p + \lambda = t_{p+1}$. This means that the output of the AND gate will stay low during the first downward edge of clock signal I after time $t_p$. Thus, on this first downward edge just after time $t_p$, the D-type flip flop will not toggle from 0 to 1. This lack of the D-type flip flop not toggling corresponds to the fact that the prime clock machine [p, 0] satisfies the property that [p, 0](p−1)=0 and [p, 0](p)=0.

A [p, s] clock machine, where 0≤s<p, can be constructed in a similar way to the clock machine [p, 0], by translating the waveform of P, shown in FIG. 4D, by an amount of time equal to sλ.

In some embodiments, elements such as aluminum, indium and arsenic, and antimony are used to build the semiconductor hardware that executes one or more clock machines. In some embodiments, these semi-conductor materials are used to build flip flops that help implement a clock machine, similar to the one shown in FIG. 4D. In other embodiments, the binary operation machine $\oplus_n$ (shown in addition instructions 308 and modulo instructions 310 of FIG. 3) combines the outputs of prime clock machines to build prime clock sum machines that are implemented in software; in some embodiments, a prime clock sum machine is implemented as a virtual machine. In an embodiment, the virtual machine executes on computing system 250 in FIG. 2B. In an embodiment, the virtual machine executes in a distributed manner on the computing system shown in FIG. 2A.

Machine Specification 4.
Prime Clock Sum Complexity
The complexity map C is defined as $C([p, t]) = 2\lceil \log_2 \rceil (p) \rceil$ if p>2 and C([2, t])=4. The complexity of $[q_1, t_1] \oplus_n [q_2, t_2] \ldots \oplus_n [q_L, t_L]$ is $$\sum_{i=1}^{l} C[q_i, t_i].$$

Machine Specification 5.
Let $r_1, \ldots r_k$ be k prime numbers and $q_1, \ldots q_r$ be r prime numbers. Let $f = [r_1, s_1] \oplus_n [r_2, s_2] \ldots \oplus_n [r_k, s_k]$. Let $g = [q_1, t_1] \oplus_n [q_2, t_2] \ldots \oplus_n [q_L, t_L]$. Define $f \oplus_n g$ in $\Omega_n$ as $(f \oplus_n g)(m) = f(m) +_n g(m)$, where $+_n$ is the binary operator in the group $(\mathbb{Z}_n, +_n)$.

Machine specification 5 is well-defined with respect to machine specification 3. In particular, $f \oplus_n g$ $[r_1, s_1] \oplus_n [r_2, s_2] \ldots \oplus_n [r_k, s_k] \oplus_n [q_1, t_1] \oplus_n [q_2, t_2] \ldots \oplus_n [q_L, t_L]$ because $(m_1 + m_2) \mod n = ((m_1 \mod n) + (m_2 \mod n)) \mod n$ for any $m_1, m_2 \in \mathbb{N}$. (See remark 1 in the appendix.)

The binary operator machine $\oplus_n$ can be extended to all of $\Omega_n$. For any $f, g \in \Omega_n$, define $(f \oplus_n g)(m) = f(m) +_n g(m)$. The associative property $(f \oplus_n g) \oplus_n h = f \oplus_n (g \oplus_n h)$ follows immediately from the fact that $+_n$ is associative. The zero function $\overline{0}$, where $\overline{0}(m) = 0$ in $\mathbb{Z}_n$, is the identity in $\Omega_n$. For any $f$ in $\Omega_n$, its unique inverse $f^{-1}$ is defined as $f^{-1}(m) = -f(m)$, where $-f(m)$ is the inverse of $f(m)$ in the group $(\mathbb{Z}_n, +_n)$. The commutativity of $\oplus_n$ follows from the commutativity of $+_n$, so $(\Omega_n, \oplus_n)$ is an abelian group.

Let $\mathcal{Q}$ be a collection of the prime clock machines $\mathcal{P}$. Using the projection $\Pi_n$ of $\mathcal{Q}$ into $\Omega_n$, define $S\mathcal{Q} = \{H: H \supseteq \Pi_n(\mathcal{Q})$ and H is a subgroup of $\Omega_n\}$. $\mathcal{Q}$ generates a subgroup $$\bigcap_{H \in S_\mathcal{Q}} H$$

of machines computing over $(\Omega_n, \oplus_n)$.

In some computing applications and embodiments, such as cryptography, the ciphers such as Midori [4] are computed with Boolean functions, so the specification sometimes refers to subgroups of $\Omega_2$, generated by a finite number of prime clocks. Consequently, the symbol ⊕ throughout the patent specification represents the symbol $\oplus_2$. In other embodiments, the prime clock machine may compute over subgroups of $\Omega_{256}$ or subgroups over $\Omega_{2^{64}}$. In these embodiments, the subscript will be explicitly shown as in the symbols $\oplus_{256}$ or $\Omega_{2^{64}}$.

6.6 Clock Machine Computation

Let $F_n$ denote the set of all Boolean functions in n variables. Mathematically, $F_n = \{f_n | f_n : \{0, 1\}^n \to \{0, 1\}\}$, so $F_n$ contains $2^{2^n}$ distinct functions with an n-bit string as input and the output is a single bit. With prime clock sum machine embodiments in mind, it is convenient to think of $f_n \in F_n$ as a binary string of length $2^n$, called the truth-table of $f_n$. FIG. 11 shows all 16 Boolean functions in $F_2$ and shows corresponding prime clock machines that compute each of these 16 functions. Since any universal computing machine [29, 30] can be constructed from these functions in $F_2$, this table demonstrates that prime clocks can be used to construct a universal machine. In some embodiments, it is advantageous to design prime clock machines that compute Boolean functions for substantially higher values of n in order to exploit the computational advantages of prime clock machines since they can compute in parallel.

Consider clock machine $[p, s]\oplus[q, t]$ in $\Omega_2$. The first $2^n$ elements of $[p, s]\oplus[q, t]$ refer to the bit string $([p, s]\oplus[q, t])(0), ([p, s]\oplus[q, t])(1), \ldots, ([p, s]\oplus[q, t])(2^n-1)$ of length $2^n$. The first $2^n$ elements of $[p, s]\oplus[q, t]$ represent a Boolean function $f_n \in F_n$. In some embodiments with $q_1, \ldots, q_L$ as primes, the first $2^n$ elements of $[q_1, t_1]\oplus[q_2, t_2]\oplus \ldots \oplus[q_L, t_L]$ represent a Boolean function $f_n \in F_n$.

Consider clock machine $[q_1, t_1]\oplus[q_2, t_2]\oplus \ldots \oplus[q_L, t_L]$ whose first $2^n$ elements represent a truth table in $F_n$; this truth table is a bit string with length $2^n$. Machine procedure 1 shows how $[q_1, t_1]\oplus[q_2, t_2]\oplus \ldots \oplus[q_L, t_L]$ computes the Boolean function $[q_1, t_1]\oplus[q_2, t_2]\oplus \ldots \oplus[q_L, t_L]: \{0, 1\}^n \to \{0, 1\}$ in L steps, where L is the number of clocks. The input is stored in the variable x, which takes up n bits of memory 256, shown in FIG. 2B. The output bit is stored in the variable y, which takes up 1 bit of memory 256, shown in FIG. 2B. In other words, computational machine 1 computes $y=[q_1, t_1]\oplus[q_2, t_2]\oplus \ldots \oplus[q_L, t_L](x)$.

---

Machine Procedure 1.
INPUT: x is a bit string in $\{0,1\}^n$
    store input value in x which takes up n bits of memory.
    set y = 0
    set k = 1
    while (k ≤ L)
    {
        set e = $(t_k + x)$ mod $q_k$
        set e = e mod 2
        set y = (y + e) mod 2
        increment k
    }
OUTPUT: y is 0 or 1.

---

The output y is called a bit output because y is 0 or 1. Output y is produced, by combining the output from the L clock machines $[q_1, t_1], [q_2, t_2], \ldots [q_L, t_L]$. In some embodiments, machine procedure 1 is coded in a programming language such as C, Python, JAVA, Haskell, LISP or Ruby and executes as a virtual machine on a standard operating system such as Apple OS, Linux, Unix, or Windows. In other embodiments, machine procedure 1 can be coded in a programming language such as C or Python and then compiled to execute on a field programmable gate array (FPGA). In other embodiments, machine procedure 1 can be implemented directly in hardware with flip flops. FIG. 4A, FIG. 4B, and FIG. 4C show how to implement a hardware prime clock machine from a D-flip flop.

In some embodiments, machine procedure 1 executes the two instructions set $e=(t_k+x)$ mod $q_k$ and set e=e mod 2, inside the while loop, in parallel with L prime clock devices implemented in hardware. In some embodiments, the prime clock devices are implemented in semiconductor hardware. In some semiconductor embodiments, the prime clock machines are constructed with counters that reset after a prime number of state changes. In these embodiments, the mod 2 operator is implemented by selecting the least significant of the counter. In other semiconductor hardware embodiments, the output of a single prime clock machine is stored in a table in memory 256, shown in FIG. 2B. In some embodiments, the prime clocks are implemented with strands of DNA or RNA. In an embodiment, one or more prime clock machines with hardware architecture (as shown in FIG. 2B) execute machine instructions according to machine procedure 1.

---

Machine Procedure 2. A Prime Clock Sum in $\Omega_2$ Computes a Boolean Function
INPUT: i
    set $r_1 = (t_1 + i)$ mod $q_1$
    set $r_2 = (t_2 + i)$ mod $q_2$
    $\ldots$
    set $r_L = (t_L + i)$ mod $q_L$
    set y = $(r_1 + r_2 + \ldots + r_L)$ mod 2
OUTPUT: y

---

The output y is called a bit output. The ith element of $([q_1, t_1]\oplus[q_2, t_2]\oplus \ldots \oplus[q_L, t_L])$'s truth table is stored in the variable y when machine procedure 2 halts. The execution of machine procedure 2 is presented in a serial form. Nevertheless, the computation of the L instructions set $r_k=(t_k+i)$ mod $q_k$, where $1 \leq k \leq L$, can be executed in parallel when there is a separate physical device for each of these L prime clocks $[q_1, t_1], [q_2, t_2] \ldots [q_L, t_L]$. Subsequently, the parity of y can be determined in a second computational step that executes a parallel add of $r_1+r_2+\ldots+r_L$, followed by setting y to the least significant bit of the sum $r_1+r_2+\ldots+r_L$.

In an embodiment, clock machine 302 in FIG. 3 represents machine procedure 2. In machine procedure 2 clocks $[q_1, t_1], [q_2, t_2], \ldots [q_L, t_L]$ are shown in Clocks 306 of FIG. 3. In machine procedure 2, the instructions set $r_1 = (t_1 + i)$ mod $q_1$ set $r_2 = (t_2 + i)$ mod $q_2$ $\ldots$ set $r_L = (t_L + i)$ mod $q_L$ are represented by Adding Instructions 308 and Modulo Instructions 310 in FIG. 3. In FIG. 3, Modulo Instructions 310 also represent the instruction set $y (r_1+r_2+\ldots+r_L)$ mod 2 in machine procedure 2. Furthermore, FIG. 3 represents both virtual machine embodiments and hardware embodiments of machine procedure 2.

In some embodiments, machine procedure 2 is coded in a programming language such as C, Python, JAVA, Haskell, LISP or Ruby and executes as a virtual machine on an operating system such as Android, Apple OS, Linux, Unix, or Windows. In other embodiments, machine procedure 2 can be coded in a programming language such as C or Python and then compiled to execute on an field programmable gate array (FPGA). FPGA hardware has the computational capability to execute one or more clock machines in parallel.

An n-bit exclusive-OR on n bits $b_1, b_2, \ldots b_n$ is denoted as $b_1 \oplus b_2 \oplus \ldots \oplus b_n$. Furthermore, if an even number of these n-bits are 1, then $b_1 \oplus b_2 \oplus \ldots \oplus b_n = 0$; if an odd number of these n-bits are 1, then $b_1 \oplus b_2 \oplus \ldots \oplus b_n = 1$.

As an alternative implementation of machine procedure 2, when there is a more suitable physical device for prime clocks, the kth clock can compute the kth bit $b_k=((t_k+i) \bmod q_k) \bmod 2$ and then an L-bit exclusive-or can be applied in parallel [34] to the bits $b_1, b_2, \ldots, b_L$.

Example

This example demonstrates 2-bit multiplication with prime clock sums, computed with machine procedure 2. In FIG. 12 for each $u \in \{0, 1\}^2$ and each $l \in \{0, 1\}^2$, the product u*l is shown in each row, whose 4 columns are labelled by $\mathcal{M}_3, \mathcal{M}_2, \mathcal{M}_1$ and $\mathcal{M}_0$. With input i of 4 bits (i.e., u concatenated with l), the output of the 2-bit multiplication is a 4-bit string $\mathcal{M}_3(i) \mathcal{M}_2(i) \mathcal{M}_1(i) \mathcal{M}_0(i)$, shown in each row of FIG. 12.

One can verify that the function $\mathcal{M}_0: \{0, 1\}^2 \times \{0, 1\}^2 \rightarrow \{0, 1\}$ can be computed with the prime clock sum $[2, 0] \oplus [7, 3] \oplus [7, 4] \oplus [7, 5] \oplus [11, 10]$, according to machine procedure 2. Similarly, the Boolean function $\mathcal{M}_1$ can be computed with the prime clock sum $[2, 0] \oplus [2, 1] \oplus [3, 0] \oplus [5, 2] \oplus [11, 0] \oplus [11, 1]$, according to machine procedure 2. The Boolean function $\mathcal{M}_2$ can be computed with the prime clock sum $[5, 0] \oplus [7, 0] \oplus [7, 2] \oplus [11, 4]$. Lastly, the function $\mathcal{M}_3$ can be computed with the prime clock sum $[2, 1] \oplus [5, 0] \oplus [11, 1] \oplus [11, 6]$. □

As described in machine specifications 1, 2, 3 and 5 and as shown in FIG. 9 one or more clock machines may also perform computations that are not (beyond) Boolean functions. Machine procedure 3 uses L clock machines $[q_1, t_1], [q_2, t_2] \ldots [q_L, t_L]$ to perform a clock machine computation where the output is one of the 3 distinct time states 0, 1, or 2.

---

Machine Procedure 3. A Prime Clock Sum in $\Omega_3$ Procedure
INPUT: i
    set $r_1 = (t_1 + i) \bmod q_1$
    set $r_2 = (t_2 + i) \bmod q_2$
    ...
    set $r_L = (t_L + i) \bmod q_L$
    set $y = (r_1 + r_2 + \ldots + r_L) \bmod 3$
OUTPUT: y is one of three distinct time states 0, 1 or 2

---

In an embodiment, clock machine 302 in FIG. 3 represents machine procedure 3. In machine procedure 3 clocks $[q_1, t_1], [q_2, t_2], \ldots [q_L, t_L]$ are shown in Clocks 306 of FIG. 3. In machine procedure 3, the instructions set $r_1 = (t_1 + i) \bmod q_1$ set $r_2 = (t_2 + i) \bmod q_2$

...

set $r_L = (t_L + i) \bmod q_L$ are represented by Adding Instructions 308 and Modulo Instructions 310 in FIG. 3. In FIG. 3, Modulo Instructions 310 also represent the instruction set $y (r_1+r_2+\ldots+r_L) \bmod 3$ in machine procedure 3. Furthermore, FIG. 3 represents both virtual machine embodiments and hardware embodiments of machine procedure 3.

Similar to FIG. 9, machine procedure 4 uses L clock machines $[q_1, t_1], [q_2, t_2] \ldots [q_L, t_L]$ to perform a clock machine computation where the output is one of the 5 distinct time states 0, 1, 2, 3, or 4.

---

Machine Procedure 4. A Prime Clock Sum in $\Omega_5$ Procedure
INPUT: i
    set $r_1 = (t_1 + i) \bmod q_1$
    set $r_2 = (t_2 + i) \bmod q_2$
    ...
    set $r_L = (t_L + i) \bmod q_L$
    set $y = (r_1 + r_2 + \ldots + r_L) \bmod 5$
OUTPUT: y is one of three distinct time states 0, 1, 2, 3 or 4

---

In an embodiment, clock machine 302 in FIG. 3 represents machine procedure 4. In machine procedure 4 clocks $[q_1, t_1], [q_2, t_2], \ldots [q_L, t_L]$ are shown in Clocks 306 of FIG. 3. In machine procedure 4, the instructions set $r_1 = (t_1 + i) \bmod q_1$ set $r_2 = (t_2 + i) \bmod q_2$

...

set $r_L = (t_L + i) \bmod q_L$ are represented by Adding Instructions 308 and Modulo Instructions 310 in FIG. 3. In FIG. 3, Modulo Instructions 310 also represent the instruction set $y (r_1+r_2+\ldots+r_L) \bmod 5$ in machine procedure 4. Furthermore, FIG. 3 represents both virtual machine embodiments and hardware embodiments of machine procedure 4.

6.7 Periodic Machine Computation

The machine specification for periodic machine (p, i): $\mathbb{N} \rightarrow \{0, 1\}$ is as follows: (p, i)(t)=1 whenever (p+t−i) mod p=0; (p, i)(t)=0 whenever (p+t−i) mod p≠0. In FIG. 21, the discrete time states of i and the height of this pulse corresponds to a digital output of 1, as specified in (p, i)(t)=1 whenever (p+t−i) mod p=0. It is assumed that 0≤i<p. p is called the period and i is the phase of this periodic machine. The output of this periodic machine is shown as 0 at the time states i+1, ..., p+i−1; in other words, all time states k satisfying i+1≤k≤p+i−1. FIG. 20 shows the periodic machine (p, 0), where the phase is 0.

The purpose of δ is to indicate the time duration of the high output, indicating the digital output of 1. In some embodiments, the output is a voltage. For example, flip-flops (FIG. 4B) have outputs (labelled Q) that store or hold a voltage. By constructing a 2-bit counter with flip flops that counts 00 at time state 0. The 2-bit counter increments to 01 at time state 1; and increments to 10 at time state 2; and increments to 11 at time state 3; and restarts at 00 at time state 4. Then the circuit just repeats. This enables a periodic machine computation to compute a two-input AND gate as follows. Map AND input (x, y)=(0, 0) to time state 0. Map AND input (x, y)=(0, 1) to time state 1. Map AND input (x, y)=(1, 0) to time state 2. Map AND input (x, y)=(1, 1) to time state 3. Thus, the periodic machine (4, 3) computes the AND gate since AND(1, 1)=1 and (4, 3)(3)=1. Furthermore, AND(0, 0)=0 and (4, 3)(0)=0. AND(0, 1)=0 and (4, 3)(1)=0. AND(1, 0)=0 and (4, 3)(2)=0.

A finite number of periodic machines can be "summed" to construct a computing machine. "Summed" means computing the logical OR (maximum) of the output of all periodic machines at a particular input time state. m periodic machines $(p_1, i_1), (p_2, i_2), \ldots, (p_m, i_m)$ can be summed to perform a computation as follows. For time state t that serves as the input, the sum $[(p_1, i_1)+(p_2, i_2)+\ldots+(p_m,$ $i_m)](t)=0$ if $(p_k, i_k)(t)=0$ for every k satisfying $1 \leq k \leq m$. Otherwise, if there is some k such that $(p_k, i_k)(t)=1$, then $[(p_1, i_1)+(p_2, i_2)+ \ldots +(p_m, i_m)](t)=1$. Thus, we can construct a 2-input OR gate as $(4, 1)+(4, 2)+(4, 3)$.

In general, a periodic machine computation is executed according to machine procedure 5, where each periodic machine $(p_k, i_k)$ can compute its output in parallel. The output of this computation is not dependent on the order shown in the while loop. Every computation $y_k=(p_k, i_k)(t)$ may be performed simultaneously with hardware that implements the periodic machine $(p_k, i_k)$. FIG. 23 shows hardware using a D flip-flop to implement periodic machine $(p, 1)$.

---

Machine Procedure 5
INPUT: Time state t represents a bit string in $\{0, 1\}^n$
    store input value in t which takes up n bits of memory.
    set k = 1
    while (k ≤ m)
    {
        set $y_k = (p_k, i_k)(t)$.
        increment k
    }
    OUTPUT: $y = \max\{y_1, y_2, \ldots, y_m\}$.

---

In machine procedure 5, max means take the maximum of all outputs $y_1, y_2, \ldots y_m$, which in some embodiments is computed by an m-bit logical OR of these outputs. In other embodiments, more than one logical OR may be used to compute the maximum. Similar to theorem 8, any Boolean function $f:\{0, 1\}^n \rightarrow \{0, 1\}$ can be computed from a finite number of periodic machines, according to machine procedure 5. As an example, in FIG. 16, the Boolean function $\pi_2 \circ S_0(x):\{0, 1\}^4 \rightarrow \{0, 1\}$—that is part of the Midori64 standard—can be implemented with the following sum of periodic machines: $[7, 4]+[8, 6]+[8, 7]+[16, 0]+[16, 2]$. Similarly, the Boolean functions that compose a round of the cryptographic cipher AES-256 can be implemented as a sum of periodic machines, since any Boolean function can be computed by a finite sum of periodic machines.

6.8 Random Clock Machines that Execute the Midori Cipher

This section of the specification demonstrates how to execute the lightweight cipher Midori [4] with random prime clock machines. In some embodiments, clock machines can execute directly in semiconductor hardware. FIG. 4A, FIG. 4B, FIG. 4C and FIG. 4D show how to implement a clock machine directly in hardware, using D-type flip flops.

The purpose of randomly generating the clock machines is to help provide greybox protection. In this specification, the greybox model assumes that the adversary Eve can observe the electromagnetic signal emitted from the processor chip executing the computer instructions and Eve knows the cryptographic algorithm executed (e.g., Midori cipher). In some embodiments, Eve does not have realtime, direct access to the prime clock machines executing a cryptographic algorithm. In some embodiments, greybox protection can help make key recovery attacks more difficult for the adversary.

6.9 A Description of the Midori Cipher

Midori consists of two different block ciphers: Midori64 and Midori128. Both use 128-bit keys. Midori64 has block size n=64. In function notation, Midori64:$\{0, 1\}^{64} \times \{0, $ $1\}^{128} \rightarrow \{0, 1\}^{64}$. The set $\{0, 1\}^{64}$ represents 64-bit blocks selected from the message space and $\{0, 1\}^{128}$ is the key space. Midori128 has block size n=128, where Midori128: $\{0, 1\}^{128} \times \{0, 1\}^{128} \rightarrow \{0, 1\}^{128}$. The first set $\{0, 1\}^{128}$ in the Cartesian product represents the 128-bit blocks selected from the message space and the second set $\{0, 1\}^{128}$ is the key space. FIG. 13 shows a summary of these Midori parameters.

Midori is a variant of a Substitution-Permutation Network cipher that has an S-layer, a P-layer and has a 4×4 data structure as the state:

$$S = \begin{pmatrix} s_0 & s_4 & s_8 & s_{12} \\ s_1 & s_5 & s_9 & s_{13} \\ s_2 & s_6 & s_{10} & s_{14} \\ s_3 & s_7 & s_{11} & s_{15} \end{pmatrix}$$

Each element (cell) $s_i$ of the state is 4 bits in Midori64 and 8 bits in Midori128. Before Midori64 encrypts a 64-bit block, the 64-bit plaintext M is stored in the state. Similarly, before Midori128 encrypts a 128-bit block, the 128-bit plaintext M is stored in the state. After the ith round, the output state is $S_i$. The 0th state $S_0=M$ since no rounds have been computed when i=0.

Next, this section describes how Midori64 and Midori128 compute their nonlinear operations. Midori64 uses the bijective 4-bit S-box $S_0:\{0, 1\}^4 \rightarrow \{0, 1\}^4$ which is defined in FIG. 14 by the row labelled with $S_0(x)$. FIG. 14 is interpreted based on the correspondence $0 \leftrightarrow 0000$, $1 \leftrightarrow 1000$, $2 \leftrightarrow 0100$, $3 \leftrightarrow 1100$, $4 \leftrightarrow 0010$, $5 \leftrightarrow 1010$, $6 \leftrightarrow 0110$, $7 \leftrightarrow 1110$, $8 \leftrightarrow 0001$, $9 \leftrightarrow 1001$, $a \leftrightarrow 0101$, $b \leftrightarrow 1101$, $c \leftrightarrow 0011$, $d \leftrightarrow 1011$, $e \leftrightarrow 0111$, $f \leftrightarrow 1111$. From the sixteenth column of FIG. 14, $S_0(e)=4$ corresponds to $S_0(0111)=0010$.

Similarly, Midori128 uses the bijective 4-bit S-box $S_1:\{0, 1\}^4 \rightarrow \{0, 1\}^4$ which is defined in FIG. 14 by the row labelled with $S_1(x)$. A bijective function $f: X \rightarrow X$ is called an involution if $f$ is its own inverse. In other words, $f \circ f(x)=x$ for every $x \in X$. Both $S_0$ and $S_1$ are involutions.

The concatenation operation $\|$ on two strings can be extended to functions. Define the concatenation operator $\|$ on $S_1$ where $S_1\|S_1:\{0, 1\}^8 \rightarrow \{0, 1\}^8$ is defined as $S_1\|S_1(x_0x_1x_2x_3x_4x_5x_6x_7)=S_1(x_0x_1x_2x_3)\|S_1(x_4x_5x_6x_7)$. Since $(S_1\|S_1)\circ(S_1\|S_1)=(S_1 \circ S_1)\|(S_1 \circ S_1)$, this implies $S_1\|S_1$ is also an involution.

Midori128 uses four 8-bit substitution boxes $\mathcal{Z}_0, \mathcal{Z}_1, \mathcal{Z}_2,$ and $\mathcal{Z}_3$, where each $\mathcal{Z}_i:\{0, 1\}^8 \rightarrow \{0, 1\}^8$. For each $i \in \{0, 1, 2, 3\}$, the substitution box $\mathcal{Z}_i$ is computed as $\mathcal{Z}_i = \sigma_i^{-1} \circ (S_1\|S_1) \circ \sigma_i$, where $S_1$ is defined in FIG. 14 and the four permutations $\sigma_i:\{0, 1\}^8 \rightarrow \{0, 1\}^8$ are defined below. First, $\sigma_0(x_0x_1x_2x_3x_4x_5x_6x_7)=x_4x_1x_6x_3\ x_0x_5x_2x_7$. Expressed as a product of disjoint cycles, $\sigma_0=(0\ 4)(2\ 6)$. Permutation $\sigma_1=(0\ 3\ 6\ 1)(2\ 5\ 4\ 7)$. Permutation $\sigma_2=(0\ 6\ 4\ 2)(1\ 3)(5\ 7)$. Permutation $\sigma_3=(0\ 5\ 6\ 7)(1\ 2\ 3\ 4)$. Now $\mathcal{Z}_i \circ \mathcal{Z}_i = \sigma_i^{-1} \circ (S_1\|S_1) \circ \sigma_i \circ \sigma_i^{-1} \circ (S_1\|S_1) \circ \sigma_i$ is the identity map since $S_1\|S_1$ is an involution. Thus, each $\mathcal{Z}_i$ is an involution.

Lastly, in order to compute the round function, the following matrix is needed $$M = \begin{pmatrix} 0 & 1 & 1 & 1 \\ 1 & 0 & 1 & 1 \\ 1 & 1 & 0 & 1 \\ 1 & 1 & 1 & 0 \end{pmatrix}.$$

6.10 Midori Round Function

The round function is comprised of an S-layer SubCell:$\{0, 1\}^n \rightarrow \{0, 1\}^n$ a P-layer ShuffleCell and MixColumn:$\{0, 1\}^n \rightarrow \{0, 1\}^n$ and a key-addition layer KeyAdd:$\{0, 1\}^n \times \{0, 1\}^n \rightarrow \{0, 1\}^n$. Each of these layers updates the n-bit state S according to the following 4 steps.

1. SubCell(S): In parallel for Midori64, S-box $S_0$ is applied to each 4-bit cell of the state S. That is, each cell is updated as $s_i \leftarrow S_0(s_i)$. In parallel for Midori128, S-box $\mathcal{Z}_{(i \bmod 4)}$ is applied to each 8-bit cell of the state S. That is, each cell is updated as $s_i \leftarrow \mathcal{Z}_{(i \bmod 4)}(s_i)$ where $0 \leq i \leq 15$.
2. ShuffleCell(S): Expressed as disjoint cycles, $\tau = (s_1\ s_7\ s_{12}\ s_{10})(s_2\ s_{14}\ s_4\ s_5)(s_3\ s_9\ s_8\ s_{15})(s_6\ s_{11})$. Each cell $s_i$, where $0 \leq i \leq 15$, of the state is permuted by $\tau$.
3. MixColumn(S): Matrix M is applied to every 4m-bit column of the state S. That is, for each $i \in \{0, 4, 8, 12\}$ $$\begin{pmatrix} s_i \\ s_{i+1} \\ s_{i+2} \\ s_{i+3} \end{pmatrix} \leftarrow \begin{pmatrix} 0 & 1 & 1 & 1 \\ 1 & 0 & 1 & 1 \\ 1 & 1 & 0 & 1 \\ 1 & 1 & 1 & 0 \end{pmatrix} \begin{pmatrix} s_i \\ s_{i+1} \\ s_{i+2} \\ s_{i+3} \end{pmatrix}$$

4. KeyAdd(S, $R_i$): The ith n-bit round key $R_i$ is XORed with the state S.

The round function is executed for Midori64 and Midori128 sixteen and twenty times, respectively.

6.11 Midori Round Key Generation

For Midori64, the 128-bit secret key K is denoted as the concatenation of two 64-bit keys $K_0$ and $K_1$, where $K = K_0 \| K_1$. The 64-bit key $W = K_0 \oplus K_1$ and the 64-bit round key $R_i = K_{(i \bmod 2)} \oplus \alpha_i$ where $0 \leq i \leq 14$. Note that $\alpha_i = \beta_i$ for $0 \leq i \leq 14$, where the round constants $\beta_i$ are defined in FIG. 15. The constants $\alpha_i$ are added bitwise to the LSB of every round key nibble.

For Midori128, the 128-bit key $W = K$ and the 128-bit round key $R_i = K \oplus \beta_i$, for $0 \leq i \leq 18$. In FIG. 15, the constants $\beta_i$ are 4×4 binary matrices. The constants $\beta_i$ are added bitwise to the LSB of every round key byte.

6.12 Executing the Midori Cipher with a Clock Machine

As discussed above, the S-box $S_0$ and the S-box $S_1$ are fundamental building blocks for the nonlinear operations in Midori64 and Midori128, respectively. FIG. 16 and FIG. 17 show functions constructed from S-boxes $S_0$ and $S_1$ and the four projection functions $\pi_i : \{0, 1\}^4 \rightarrow \{0, 1\}$ where $\pi_i(x_0 x_1 x_2 x_3) = x_i$ for each $i \in \{0, 1, 2, 3\}$. For example, in FIG. 16 $\pi_3 \circ S_0(7) = 0$. This is computed by reading from FIG. 14 that $S_0(7) = 7$; using the correspondence $7 \leftrightarrow 1110$; and then $\pi_3$ selecting the $x_3$ bit from 1110.

Prime clock sum $[2, 1] \oplus [3, 2] \oplus [5, 2] \oplus [17, 16]$ is located in the last row and last column of FIG. 16. When machine 1 is executed, $([2, 1] \oplus [3, 2] \oplus [5, 2] \oplus [17, 16])(7) = ([2, 1](7) + [3, 2](7) + [5, 2](7) + [17, 16](7)) \bmod 2 = 0$. Thus, prime clock sum $[2, 1] \oplus [3, 2] \oplus [5, 2] \oplus [17, 16](7)$ computes $\pi_3 \circ S_0(7)$ and has complexity 24.

As another example of a prime clock machine execution, in FIG. 17 $\pi_2 \circ S_1(4) = 1$. This is computed by reading from FIG. 14 that $S_1(4) = e$; using the correspondence $e \leftrightarrow 0111$; and then $\pi_2$ selecting the the $x_2$ bit from 0111. The corresponding prime clock sum is applied to 4. $([2, 1] \oplus [7, 6] \oplus [11, 0] \oplus [13, 3] \oplus [17, 10])(4) = (1+3+4+7+14) \bmod 2 = 1$.

The prime clock sums in FIG. 16 and FIG. 17 were computed by machine procedure 6 that randomly builds p-clock sums from the first 8 primes $\{2, 3, 5, 7, 11, 13, 17, 19\}$. Overall, from sections 6.9 and 6.10, it is straightforward to build SubCell(S) function, based on the prime clock sums in FIG. 16 and FIG. 17.

Next we turn to the linear operations used in Midori64 and Midori128. First, observe that the other three layers Shuffle-Cell(S), MixColumn(S), and KeyAdd(S) can be constructed from affine Boolean functions.

ShuffleCell(S) is a permutation $\tau$ of the state S, where $\tau = (s_1\ s_7\ s_{12}\ s_{10})(s_2\ s_{14}\ s_4\ s_5)(s_3\ s_9\ s_8\ s_{15})(s_6\ s_{11})$. In Midori64, $\tau : \{0, 1\}^{64} \rightarrow \{0, 1\}^{64}$, where $\tau(x) = (\tau_0(x), \tau_1(x), \ldots, \tau_{63}(x))$ and each $\tau_i : \{0, 1\}^{64} \rightarrow \{0, 1\}$ is an affine function. In Midori128, $\tau : \{0, 1\}^{128} \rightarrow \{0, 1\}^{128}$, where $\tau(x) = (\tau_0(x), \ldots \tau_{127}(x))$ and each $\tau_i : \{0, 1\}^{128} \rightarrow \{0, 1\}$ is an affine function.

In MixColumn(S), each row×column multiplication in the matrix multiplication is a dot product on the vector space over $\mathbb{F}_2$. For example, the first row of M corresponds to the affine map $A_{0111,0}$, which is defined in FIG. 19.

In KeyAdd(S, $R_i$), each $R_i$ is built from a different constant from FIG. 15 and XOR'd with the state, so KeyAdd (S, $R_i$) is also composed of affine Boolean functions.

FIG. 19 shows a list of every affine map $A_{a_0 a_1 a_2 a_3, c} : \{0, 1\}^4 \rightarrow \{0, 1\}$ such that $c=0$. In the last column, the specified affine map is computed by a random prime clock sum machine built from the 8 primes $\{2, 3, 5, 7, 11, 13, 19\}$. The affine maps $A_{a_0 a_1 a_2 a_3, 1} : \{0, 1\}^4 \rightarrow \{0, 1\}$ can be constructed by adding prime clock sum machine $[2, 0] \oplus [2, 1]$ to each of the prime clock sum machines in FIG. 19. This machine composition works because $\neg A_{a_0 a_1 a_2 a_3, 0} = A_{a_0 a_1 a_2 a_3, 1}$ and $([2, 0] \oplus [2, 1])(m) = 1$ for every number $m \in \mathbb{N}$.

Overall, the Midori cipher can be executed with prime clocks chosen from the first 8 primes. Of the first 8 primes, $\{5, 13, 17\}$ are the 1 mod 4 primes. Define function $\alpha_4$ on the primes as follow. If $(p > 16)$ then $\alpha_4(p) = 16$. If $p < 16$ and $p$ is a 1 mod 4 prime then $\alpha_4(p) = p-1$. If $p < 16$ and $p$ is a 3 mod 4 prime or $p=2$, then $\alpha_4(p) = p$. There are $2^{2^4} = 2^{16}$ distinct Boolean functions $f : \{0, 1\}^4 \rightarrow \{0, 1\}$. $2^{2+3+(5-1)+7} = 2^{16}$, so prime clock sums, constructed from the first 4 primes, can compute any Boolean function $f : \{0, 1\}^4 \rightarrow \{0, 1\}$. Note that $$2^{\sum_{i=1}^{5} \alpha_4(p_i)} = 2^{16} 2^{56}.$$

In section 6.15, machine lemma 3 and machine corollaries 5 and 7 imply that for each $f : \{0, 1\}^4 \rightarrow \{0, 1\}$, there are $2^{56}$ different prime clock sums, constructed from the first 8 primes, that compute $f$. Note $2^{56} > 10^{16}$. Thus, each processor chip could be programmed with a unique collection of random prime clock sums that compute the Midori cipher such that the probability of two distinct processor chips computing the Midori cipher with identical random prime clock sums over the primes $\{p_1, p_2, \ldots, p_8\}$ is substantially less than $10^{-9}$. A unique computational footprint for each chip can substantially obfuscate the execution of the Midori cipher and also break up any type of timing patterns during the cipher's execution.

6.13 Random Clock Machines

This section describes machine procedure 6 that uses randomness for finding a clock machine that computes $f : \{0,$ $1\}^n \rightarrow \{0, 1\}$. In an embodiment, random clock machines are chosen, using non-deterministic process 542 in FIG. 5A. In an embodiment, random clock machines are chosen, using non-deterministic process 552 in FIG. 5B. After the machine procedure 6 description, an augmentation is described that can help substantially increase the process speed for constructing prime clock machines that compute $f$. In an embodiment, 64 distinct $f$'s: $f_0, f_1, f_2, \ldots, f_{63}$ that compute the addition of two 64-bit numbers in binary.

Some parameters are passed into the probabilistic machine and also a computable representation as either a software or hardware embodiment of Boolean function $f$. The purpose is to be able to compute $f(x)$ on every input $x \in \{0, 1\}^n$. A distance metric H, computed as a machine, between 2 functions is also needed.

Let Q be a prime clock sum machine. Let $f$ be a computable representation of Boolean function $f$: $\{0, 1\}^n \rightarrow \{0, 1\}$. The function $f \oplus Q: \{0, 1\}^n \rightarrow \{0, 1\}$ is defined as $f(x) \oplus Q(x)$. Define the Hamming distance between these two functions as $H(Q, f) = |(f \oplus Q)^{-1}\{1\}|$, where inverse image $(f \oplus Q)^{-1}\{1\} = \{x \in \{0, 1\}^n: f(x) \oplus Q(x) = 1\}$. If $H(Q, f) = 0$, then $Q(x) = f(x)$ for every x in $\{0, 1\}^n$.

The first parameter passed in is a positive integer u. u is an upper bound on the index of the primes to use for selecting prime clocks. For example, if u=6, then machine procedure 6 builds clock machines from the primes $\{2, 3, 5, 7, 11, 13\}$.

The second and third parameters passed in are $r_{lb}$ and $r_{ub}$ such that $r_{lb} \leq r_{ub}$, which create a range of values for the number of random prime clocks to use to build prime clock machine Q. The fourth parameter passed in is s, which is the number of different random prime clocks machines to build for each value of r in $\{r_{lb}, r_{lb}+1, \ldots, r_{ub}\}$. The fifth parameter passed in is n.

Machine Procedure 6.

Random Prime Clock Machines that Compute f set $r = r_{lb}$ set $m = \dfrac{n}{2}$ while ($r \leq r_{ub}$)
{
 set c = 0
 while (c ≤ s)
 {
  set k = 0
  while (k ≤ r)
  {
   choose a random integer i in [1, u]
   choose a random integer t in [0, $p_i$ - 1]
   if k = 0 set Q = [$p_i$, t]
   else set Q = Q ⊕ [$p_i$, t]
   increment k
  }
  set h = H (Q, f)
  if (h = 0) return $Q_{best}$
  else if (h = n) return [2, 0] ⊕ [2,1] ⊕ Q
  if (h < m)
  {
   set prime clock sum machine $Q_{best}$ = Q
   set m = h
  }
  increment c
 }
 increment r
}
return $Q_{best}$ In an embodiment, non-deterministic process 542 or non-deterministic process 552 in FIG. 5B are used to help implement the instructions
 choose a random integer i in [1, u]
 choose a random integer t in [0,$p_i$−1]
in machine procedure 6. In an embodiment, non-deterministic process 542 or non-deterministic process 552 help the first instruction randomly choose $p_i$. Recall that $p_i$ is the number of distinct time states in the randomly constructed clock machine. In an embodiment, non-deterministic process 542 or non-deterministic process 552 help the second instruction randomly choose t, which is the starting time state in clock machine [$p_i$, t].

The search process time for machine $Q_{best}$ can be substantially reduced by passing in a small s; and then exiting machine 6 with prime clock machine $Q_{best}$ and then repairing $Q_{best}$ at Z such that $Q_{best}(x) \oplus f(x) = 1$. As an example, for n=4, suppose that the computation $Q_{best}(12) \oplus f(12)=1$, then repair machine $Q_{best}$ by updating it to prime clock sum machine [2, 0]⊕[2, 1]⊕[17, 6]⊕[17, 7]⊕$Q_{best}$. If $Q_{best}(i) \oplus f(i) = 1$ at i=10 and i=11, then update $Q_{best}$ to [17, 5]⊕[17, 7]⊕$Q_{best}$. A similar repair machine can be used for larger n with a prime $p > 2^n$.

In an alternative embodiment, periodic machines (shown in FIG. 20, FIG. 21, FIG. 22, and FIG. 23) may be also used in addition to clock machines in machine procedure 6. In this alternative embodiment, the sum of a periodic machine to the other machines is a logical OR. In another embodiment, only periodic machines may be used in a machine procedure similar to machine procedure 6, to build a random implementation of Boolean function $f$.

6.14 Timing Differences in Clock Machines

The purpose of this section is to better understand timing differences that occur when different instances of machine procedures 1 are executed. It is well-known in the prior art that timing differences can be exploited to capture a key from a cryptographic cipher and break the cryptography. (See [5, 20].) In the prior art, standard digital computers often have timing differences due to branch instructions. There are two places in the execution of machine procedure 1 where timing differences could occur:

1. The size of r is the number of clocks in the prime clock sum.

2. The two instructions set $e = (t_k + x)$ mod $q_k$ and set e=e mod 2 depend upon $q_k$, $t_k$ and x.

The other instructions such as set y (y+e) mod 2 should exhibit no timing differences because both y and e store 0 or 1 and y ^=e; is the C source code for this mathematical operation.

For these reasons, the Intel timestamp instruction RDTSC [17] was called to measure timing differences with b−a, as shown in the following C source code. The value b−a is the number of Intel CPU clock cycles that occur during the CPU's execution of the two instructions e=(t+x) % p; and e &=1;

```
static __inline__ unsigned long long rdtsc(void)
{
    unsigned hi, lo;
    __asm____volatile__ ("RDTSC" : "=a" (lo), "=d" (hi));
    return ( (unsigned long long) lo) | (((unsigned long long) hi) << 32);
}
```

-continued

```
unsigned long long a, b;
for(x = 0; x < 65535; x++)
{
    for(t = 0; t < p; t++)
    {
        a = rdtsc( );
            e = (t + x) % p;
            e &= 1;
            b = rdtsc( ) ;
    }
}
```

A 2.5 GHz Intel Core i5 CPU executed for these timing tests. Our timing results were measured on the first 100 primes p; on each prime clock ticking time t such that $0 \leq t < p$; and all 16-bit input values x. For a fixed triplet (p, t, x), the CPU clock cycles timing difference b−a was measured on 1000 samples.

In FIG. 18, the range [24, 25] in the 2-clock column indicates that 95 percent of the measurements b−a satisfied $24 \leq b-a \leq 25$ over all of the 2-clock machine tests. The same ranges of [23, 25] or [24, 25] were also obtained for the remaining 92 primes {23, 29, . . . , 523, 541}.

In some embodiments, timing tests for prime clock machines executing in semiconductor hardware suggest that the number of clocks (parameter r in algorithm 1) in the sum is the primary influence on execution time. In some embodiments, prime clocks execute in parallel to help eliminate timing differences.

An alternative embodiment varies the number of clocks for each random prime clock sum machine instantiation in hardware: in the greybox model, Eve would not know for a particular processor chip how many prime clocks are used to implement the $S_0$ or $S_1$ S-boxes or the number of clocks used to implement one of the affine maps that compose the ShuffleCell(S), MixColumn(S) or KeyAdd(S) layers.

6.15 Clock Machine Properties and Theorems

This section provides further specifications, properties and proofs about prime clock machines and in particular finite prime clock machines executing in $\Omega_2$. The intermediate results work toward the theorem 8, stated in the introduction: For any positive integer n, for each of the $2^{2^n}$ Boolean functions $f: \{0, 1\}^n \to \{0, 1\}$, there exists a finite sum of prime clock machines executing in $\Omega_2$ that can compute f. Because universal computing machines [29, 30] can be computed using Boolean functions as building blocks, this means that universal computing machines can be constructed from prime clock machines.

First, a remark is proven that was cited in section 6.5.
Machine Remark 1.
$(m_i + m_2) \mod n = ((m_i \mod n) + (m_2 \mod n)) \mod n$.
PROOF. Euclid's division algorithm implies that $m_1 = k_1 n + r_1$ and $m_2 = k_2 n + r_2$, where $0 \leq r_1, r_2 < n$. Now $(m_1 + m_2) \mod n = ((k_1 + k_2) n + r_1 + r_2) \mod n = (r_1 + r_2) \mod n = ((m_1 \mod n) + (m_2 \mod n)) \mod n$ □

The following equivalence relation on N induced by a function $f \in \Omega_n$ helps characterize prime clock sums.
Machine Specification 6.

For any $f \in \Omega_n$, define the relation $\tilde{f}$ on N such that $x \underset{f}{\sim} y$ if and only if for all $m \in \mathbb{N}$, $f(m) = f(m + |y-x|)$.

Trivially, $\tilde{f}$ is reflexive and symmetric. Next, transitivity of $\tilde{f}$ is verified. Suppose $x \underset{f}{\sim} y$ and $y \underset{f}{\sim} z$. W.L.O.G., suppose $x \leq y \leq z$. (The other orderings of x, y and z can be handled by permuting x, y and z in the following steps.) This means for all $m \in \mathbb{N}$, $f(m+y-x) = f(m)$; and for all $k \in \mathbb{N}$, $f(k) = f(k+z-y)$. This implies that for all $m \in \mathbb{N}$, $f(m+z-x) = f(m+z-y+y-x) = f(m+y-x) = f(m)$.
Machine Remark 2.

$\tilde{f}$ is an equivalence relation.
Machine Specification 7.
Periodic Functions $f \in \Omega_n$ is a periodic function if there exists a positive integer b such that for every $m \in \mathbb{N}$, then $f(m) = f(m+b)$. Furthermore, if a is the smallest positive integer such that $f(m) = f(m+a)$ for all $m \in \mathbb{N}$, then a is called the period of f. After k substitutions of m+a for m, this implies for any $m \in \mathbb{N}$ that $f(m) = f(m+ka)$ for all positive integers k.

As shown in FIG. 7, both prime clocks [2, 0] and [2, 1] projected into $\Omega_2$ have period 2. Both prime clock machines [3, 0] and [3, 1] projected into $\Omega_2$ have period 3. Each prime clock sum [2, 0]⊕[3, 0], [2, 1]⊕[3, 0] and [2, 0]⊕[3, 1] has period 6.

When f is periodic with period a, each equivalence class is of the form [k] = {k+ma: $m \in \mathbb{N}$}, where $0 \leq k < a$. Thus, f has period a implies there are a distinct equivalence classes on N with respect to $\tilde{f}$.
Machine Remark 3.

If a is the period of f and b is a positive integer such that $f(m) = f(m+b)$ for all $m \in \mathbb{N}$, then a divides b.

PROOF. First, verify that $a \underset{f}{\sim} b$. By the definition of period, $a \leq b$ and for all $m \in \mathbb{N}$, then $f(m+b-a) = f(m+a+b-a) = f(m+b) = f(m)$. From the prior observation, a lies in [0] and b also lies in [0]. Thus, b=ma for some positive integer m. □
Machine Lemma 1.

If f, $g \in \Omega_n$ are periodic, then $f \oplus_n g$ is periodic. Further, if the period of f is a and the period of g is b, then $f \oplus_n g$ has a period that divides 1 cm(a, b).

PROOF. Let a be the period of f and b the period of g. Let $l_{a,b} = 1$ cm(a, b). $l_{a,b} = ia$ and $l_{a,b} = jb$ for positive integers i, j. For any $m \in \mathbb{N}$, $(f \oplus_n g)(m) = f(m) +_n g(m) = f(m+ia) +_n g(m+jb) = f(m+l_{a,b}) +_n g(m+l_{a,b}) = (f \oplus_n g)(m+l_{a,b})$. Thus, $f \oplus_n g$ is periodic and remark 3 implies its period divides $l_{a,b}$. □

In regard to lemma 1, if $g = -f$, then the period of $f \oplus_n g$ is 1.
Machine Remark 4.

There are $n^a$ distinct periodic functions $f \in \Omega_n$ whose period divides a.

PROOF. Since f is periodic and its period divides a, the values of $f(0), f(1), \ldots, f(a-1)$ uniquely determine f. There are n choices for $f(0)$. There are n choices for $f(1)$, and so on. □

Periodic functions with prime periods are straightforward to count.
Machine Remark 5.

Suppose p is prime. There are $n^p - n$ distinct periodic functions $f \in \Omega_n$ with period p.

PROOF. Consider a finite sequence $c_0, c_1, \ldots c_{p-1}$ of length p where each $c_i \in \mathbb{Z}_n$. This sequence uniquely determines a periodic f such that $f(m+p) = f(m)$ for all $m \in \mathbb{N}$. In particular, $f(0) = c_0, f(1) = c_1, \ldots, f(p-1) = c_{p-1}$. There are $n^p$ periodic functions with a period that divides p. If the period of f is less than p, then remark 3 implies f has period 1 since p is prime. There are n distinct, constant (period 1) functions in $\Omega_n$ Thus, the remaining $n^p - n$ periodic functions have period p. □

Machine Remark 6.

The prime clock [p, t], projected into $\Omega_n$, has period p.

PROOF. Since p is prime, this follows immediately from remark 3. □

Machine Theorem 2.

Finite Prime Clock Sums are Periodic

Any finite sum of prime clock machines $[q_1, t_1] \oplus_n [q_2, t_2] \oplus_n \ldots \oplus_n [q_1, t_1]$ is periodic.

PROOF. Use induction and apply remark 6 and lemma 1. □

The following statements are restricted to $\Omega_2$.

Machine Remark 7.

$[p, t] \oplus [p, t] \overline{0}$ for any prime clock [p, t].

Per definition 2, $([p, k] \oplus [p, k])(m) = ([p, k](m) + [p, k](m))$ mod $2 = 0$ in $\mathbb{Z}_2$.

Let $f \in \Omega_n$. If $f$ is a constant function where $f(m) = c$ for all $m \in \mathbb{N}$, then the expression $f = \overline{c}$ indicates this.

Machine Remark 8.

Let p be an odd prime. If p is a 3 mod 4 prime, then prime clock machine $[p, 0] \oplus [p, 1] \oplus \ldots \oplus [p, p-1] = \overline{1}$. If p is a 1 mod 4 prime, then prime clock machine $[p, 0] \oplus [p, 1] \oplus \ldots \oplus [p, p-1] = \overline{0}$.

PROOF. $([p, 0] \oplus [p, 1] \oplus \ldots \oplus [p, p-1])(0) = (0+1+\ldots+p-1)$ mod $2 = \frac{1}{2}(p-1)p$ mod 2. For each $m > 0$, $([p, 0] \oplus [p, 1] \oplus \ldots \oplus [p, p-1])(m)$ is a permutation of the sum inside $(0+1+\ldots+p-1)$ mod 2. □ For the special case $p=2$, observe that $[2, 0] \oplus [2, 1] = \overline{1}$.

Machine Specification 8.

A finite sum $[q_1, t_1] \oplus [q_2, t_2] \oplus \ldots \oplus [q_1, t_1]$ machine of prime clocks is non-repeating if $i \neq j$ implies $[q_i, t_i]$ is not equal to $[q_j, t_j]$.

Machine Remark 9.

Any finite sum $[q_1, t_1] \oplus [q_2, t_2] \oplus \ldots \oplus [q_l, t_l]$ of prime clock machines in $\Omega_2$ can be reduced to a non-repeating finite sum $[q_{i_1}, t_{i_1}] \oplus [q_{i_2}, t_{i_2}] \oplus \ldots \oplus [q_{i_r}, t_{i_r}]$, where $r \leq l$ such that for any $m \in \mathbb{N}$, $([q_1, t_1] \oplus [q_2, t_2] \oplus \ldots \oplus [q_l, t_l])(m) = ([q_{i_1}, t_{i_1}] \oplus [q_{i_2}, t_{i_2}] \oplus \ldots \oplus [q_{i_r}, t_{i_r}])(m)$.

Since $(\Omega_2, \oplus_2)$ is abelian, if necessary, rearrange the order of $[q_1, t_1] \oplus [q_2, t_2] \oplus \ldots \oplus [q_l, t_l]$, so that the prime clocks are ordered using the dictionary order. If two or more adjacent prime clocks are equal, then the associative property and remark 7 enables the cancellation of even numbers of equal prime clocks. This reduction can be performed a finite number of times so that the resulting sum is non-repeating. □

Machine Specification 9.

Let p be a prime. A finite sum of prime clock machines $[p, t_1] \oplus [p, t_2] \oplus \ldots [p, t_{l-1}] \oplus [p, t_l]$ is called a p-clock sum of length l if for each $1 \leq i \leq l$, the clock $[p, t_i]$ is a p-clock machine and the sum is non-repeating. The non-repeating condition implies $l \leq p$.

Machine Lemma 3.

Let p be a prime. A p-clock machine sum with length p has period 1. A p-clock machine sum with length l such that $1 \leq l < p$ has period p.

PROOF. When $p=2$, the 2-clock sum [2, 0] has period 2 and the 2-clock sum [2, 1] also has period 2. Recall that $[2, 0] \oplus [2, 1] = \overline{1}$. For the remainder of the proof, it is assumed that p is an odd prime.

Let $[p, t_1] \oplus [p, t_2] \oplus \ldots [p, t_{l-1}] \oplus [p, t_l]$ be a p-clock sum. When $l = p$, remark 8 implies that $[p, t] \oplus [p, t_2] \oplus \ldots [p, t_{l-1}] \oplus [p, t_l]$ has period 1. Lemma 1 and remark 6 imply that $[p, t_1] \oplus [p, t_2] \oplus \ldots [p, t_{l-1}] \oplus [p, t_l]$ has period p or period 1. The rest of this proof shows that $1 \leq l \leq p-1$ implies that the p-clock sum cannot have period 1.

Thus, it suffices to show that $1 \leq l < p$ implies that $([p, t_1] \oplus [p, t_2] \oplus \ldots \oplus [p, t_l])(m) \neq ([p, t_1] \oplus [p, t_2] \oplus \ldots \oplus [p, t_l])(m+1)$ for some $m \in \mathbb{N}$. If needed, the p-clock sum may be permuted so that $[p, s_1] \oplus [p, s_2] \oplus \ldots \oplus [p, s_l] = [p, t_1] \oplus [p, t_2] \oplus \ldots \oplus [p, t_l]$ and the $s_i$ are strictly increasingly. Strictly increasing means $0 \leq s_1 < s_2 \ldots s_{l-1} < s_l \leq p-1$.

Case A. l is odd. If $s_l < p-1$, then $$([p, s_1] \oplus [p, s_2] \oplus \ldots \oplus [p, s_l])(0) =$$

$$\sum_{i=1}^{l} s_i \bmod 2 \neq \sum_{i=1}^{l} (s_i + 1) \bmod 2 = ([p, s_1] \oplus [p, s_2] \oplus \ldots \oplus [p, s_l])(1)$$

because l is odd.

Otherwise, $s_l = p-1$. Set $s_0 = 0$. (The auxiliary index $s_0 = 0$ handles the case $s_{k+1} - s_k$ for all k such that $1 \leq k \leq l$.) Set $m = \max \{k \in \mathbb{N} : s_{k+1} - s_k \geq 2 \text{ and } 0 \leq k < l\}$. Since $s_0 = 0$ and $1 \leq l < p$ the pigeonhole principle implies m exists. Before the mod 2 step, the difference between $$\sum_{i=1}^{l} ((s_i + l - m + 1) \bmod p) \text{ and } \sum_{i=1}^{l} ((s_i + l - m) \bmod p)$$

equals 1. Thus, $([p, s_1] \oplus [p, s_2] \oplus \ldots \oplus [p, s_l])(l-m) \neq ([p, s_1] \oplus [p, s_2] \oplus \ldots \oplus [p, s_l])(l-m+1)$.

Case B. l is even. Set $j = (p-1) - s_l$. Before the mod 2 step, the sum $$\sum_{i=1}^{l} ((s_i + j) \bmod p)$$

differs from the $$\text{sum} \sum_{i=1}^{l} ((s_i + j + 1) \bmod p)$$

by an odd number. Thus, $([p, s_1] \oplus \ldots \oplus [p, s_l])(j) \neq ([p, s_1] \oplus \ldots \oplus [p, s_l])(j+1)$. □.

Machine Specification 10.

Let p be prime. The p-clock machine sum $[p, s_1] \oplus \ldots \oplus [p, s_l]$ is distinct from the p-clock machine sum $[p, t_1] \oplus \ldots \oplus [p, t_m]$ if $l \neq m$ or if for some i, prime clock $[p, s_i]$ machine is not an element of the set of machines $\{[p, t_1], [p, t_2], \ldots [p, t_m]\}$.

7-clock sum $[7, 2] \oplus [7, 3]$ is distinct from $[7, 2] \oplus [7, 3] \oplus [7, 4]$. 7-clock sum $[7, 0] \oplus [7, 2] \oplus [7, 3]$ is distinct from $[7, 1] \oplus [7, 2] \oplus [7, 3]$.

Machine Theorem 4.

For any 3 mod 4 prime p, if two p-clock sums are distinct, then they are not equal in $\Omega_2$. The theorem also holds for $p=2$.

PROOF. The special case $p=2$ is verified by examining columns 2 and 3 of FIG. 7.

Let p be a 3 mod 4 prime. Assume p-clock sum $[p, s_1] \oplus \ldots \oplus [p, s_l]$ is distinct from p-clock sum $[p, t_1] \oplus \ldots \oplus [p, t_m]$. By reductio absurdum, suppose $$[p, s_1] \oplus \ldots \oplus [p, s_l] = [p, t_1] \oplus \ldots \oplus [p, t_m]. \tag{6.2}$$

For each $s_i \in \{t_1, \ldots, t_m\}$, the operation $\oplus[p, s_i]$ in $\Omega_2$ can be applied to both sides of equation 6.2. Similarly, for each $t_j \in \{s_1, \ldots, s_l\}$, the operation $\oplus[p, t_j]$ can be applied to both sides of equation 6.2. Since $(\Omega_2, \oplus)$ is an abelian group, equation 6.2 can be simplified to $[p, s_1] \oplus \ldots \oplus [p, s_L] = [p, t_1] \oplus \ldots \oplus [p, t_M]$ such that $\{s_1, \ldots, s_L\} \cap \{t_1, \ldots, t_M\} = \emptyset$ and $M+L \leq p$.

Set $f = [p, s_1] \oplus \ldots \oplus [p, s_L]$. Apply $f \oplus$ to both sides of $[p, s_1] \oplus \ldots \oplus [p, s_L] = [p, t_1] \oplus \ldots \oplus [p, t_M]$. This simplifies to $f \oplus [p, t_1] \oplus \ldots \oplus [p, t_M] = \overline{0}$. Lemma 3 implies that $L+M = p$. Since $L+M = p$ and $\{s_1, \ldots, s_L\} \cap \{t_1, \ldots, t_M\} = \emptyset$ and $p$ is a 3 mod 4 prime, remark 8 implies that $f \oplus [p, t_1] \oplus \ldots \oplus [p, t_M] = \overline{1}$. This is a contradiction, so $[p, s_1] \oplus \ldots \oplus [p, s_l]$ is not equal to $[p, t_1] \oplus \ldots \oplus [p, t_m]$ in $\chi_2$. □

Let $S_l$ be the set of all p-sums of length l, where $1 \leq l \leq p$. There are $\binom{p}{l}$ distinct p-sums in each set $S_l$. Set $$G_p = \bigcup_{l=1}^{p} S_l \cup \{\overline{0}\}.$$

For any $f, g \in G_p$, remark 7 implies $f \oplus g^{-1}$ in $G_p$. Thus, $(G_p, \oplus)$ is an abelian subgroup of $\Omega_2$.

Set $B_p = \{0, 1\}^p$. For any $a_1 \ldots a_p \in B_p$ and $b_1 \ldots b_p \in B_p$, define $a_1 \ldots a_p +_2 b_1 \ldots b_p = c_1 \ldots c_p$, where $c_i = (a_i + b_i) \mod 2$. $(B_p, +_2)$ is an abelian group with $2^p$ elements.

When p is a 3 mod 4 prime, define the group isomorphism $\phi: G_p \to B_p$ where $\phi(\overline{0}) = 0 \ldots 0 \in B_p$ and $\phi([p, t_1] \oplus [p, t_2] \oplus \ldots \oplus [p, t_l]) = c_1 \ldots c_p$ where $c_i = ([p, t_1] \oplus [p, t_2] \oplus \ldots \oplus [p, t_l])(i)$.

Machine Corollary 5.

Let p be a 3 mod 4 prime. The subgroup $G_p$ of $\chi_2$, generated by the p-clocks $[p, 0], [p, 1], \ldots [p, p-1]$ has order $2^p$ and is isomorphic to $(B_p, +_2)$.

PROOF. Theorem 4 implies $\phi$ is a group isomorphism.

Theorem 4 does not hold when p is a 1 mod 4 prime. For example, $[5, 0] \oplus [5, 1]$ equals $[5, 2] \oplus [5, 3] \oplus [5, 4]$.

Machine Theorem 6.

For any 1 mod 4 prime p, if two p-clock sums are distinct and their lengths are both $\leq$ $$\frac{p-1}{2},$$

then they are not equal in $\Omega_2$.

PROOF. The proof is almost the same as the proof in theorem 4, except the additional condition that $$L \leq \frac{p-1}{2} \text{ and } M \leq \frac{p-1}{2}$$

and reduction $[p, s_1] \oplus \ldots \oplus [p, s_L] \oplus [p, t_1] \oplus \ldots \oplus [p, t_M] = \overline{0}$ leads to an immediate contradiction: $L+M \leq p-1$ and $\{s_1, \ldots, s_L\} \cap \{t_1, \ldots, t_M\} = \emptyset$ means lemma 3 implies $[p, s_1] \oplus \ldots \oplus [p, s_L] \oplus [p, t_1] \oplus \ldots \oplus [p, t_M]$ has period p. □

Machine Remark 10.

Let p be a 1 mod 4 prime. Let $f = [p, s_1] \oplus \ldots \oplus [p, s_l]$ for some $1 \leq l \leq \frac{1}{2}(p-1)$. Set $T = \{0, 1, \ldots, p-1\} - \{s_1, \ldots, s_l\}$. Now $T \{t_1, \ldots, t_m\}$, where $l+m = p$. Set $g = [p, t_1] \oplus \ldots \oplus [p, t_m]$. Then $f = g$ in $\Omega_2$.

PROOF. Since p is a 1 mod 4 prime, $$(f \oplus g)(0) = \sum_{0}^{p-1} k \mod 2 = 0$$

in $\mathbb{Z}_2$. When $k > 1$, the sum of the elements of $f \oplus g$ before projecting into $\Omega_2$ is a permutation of the elements $\{0, 1, \ldots, p-1\}$. Thus, for all $k > 1$, $(f \oplus g)(k) = 0$ in $\mathbb{Z}_2$. This means $g = f^{-1}$. Lastly, $f = f^{-1}$ in $\Omega_2$, so $f = g$ in $\Omega_2$. □

Let p be a 1 mod 4 prime. Set $$H_{p-1} = \bigcup_{l=1}^{\frac{1}{2}(p-1)} S_l \cup \{\overline{0}\}.$$

Observe that $$|H_{p-1}| = \sum_{l=1}^{\frac{1}{2}(p-1)} \binom{p}{k} + 1 = 2^{p-1}.$$

To verify that $(H_{p-1}, \oplus)$ is a subgroup of $(\Omega_2, \oplus)$, let $f, g \in H_{p-1}$. Since $g = g^{-1}$ in $(\Omega_2, \oplus)$, it suffices to show that $f \oplus g$ lies in $H_{p-1}$. If $f$ or g equals $\overline{0}$, closure in $(H_{p-1}, \oplus)$ holds. Otherwise, $f = [p, s_1] \oplus \ldots \oplus [p, s_l]$ for some $1 \leq l \leq \frac{1}{2}(p-1)$ and $g = [p, t_1] \oplus \ldots \oplus [p, t_m]$ for some $1 \leq m \leq \frac{1}{2}(p-1)$. As mentioned before, the sum $f \oplus g$ may be reduced to $[p, s_1] \oplus \ldots \oplus [p, s_L] \oplus [p, t_1] \oplus \ldots \oplus [p, t_M]$, where $\{s_1, \ldots, s_L\} \cap \{t_1, \ldots, t_M\} = \emptyset$ and $L+M \leq p$. If $L+M \leq \frac{1}{2}(p-1)$, closure in $(H_{p-1}, \oplus)$ holds. Otherwise, if $L+M > \frac{1}{2}(p-1)$, remark 10 implies that there is a p-sum $h = f \oplus g$, where h's length is $p-(L+M)$ and $p-(L+M) \leq \frac{1}{2}(p-1)$.

Similar to the group isomorphism $\phi$, define $\psi: H_{p-1} \to B_{p-1}$ such that $\psi(\overline{0}) = 0 \ldots 0 \in B_p$. For each p-sum in $S_l$, where $1 \leq l \leq \frac{1}{2}(p-1)$, define $\psi([p, t_1] \oplus [p, t_2] \oplus \ldots \oplus [p, t_l]) = c_1 \ldots c_{p-1}$ where $c_i = ([p, t_1] \oplus [p, t_2] \oplus \ldots \oplus [p, t_l])(i)$. It is straightforward to verify that L is a group isomorphism onto $B_{p-1}$. The group isomorphism $\psi: H_{p-1} \to B_{p-1}$ leads to the following corollary.

Machine Corollary 7.

Let p be a 1 mod 4 prime. The subgroup $H_{p-1}$ of $\Omega_2$, generated by the p-clock machines $[p, 0], [p, 1], \ldots [p, p-1]$ has order $2^{p-1}$ and is isomorphic to $(B_{p-1}, +_2)$.

Machine Theorem 8.

Let n be a positive integer. For any of the $2^{2^n}$ boolean functions $f: \{0, 1\}^n \to \{0, 1\}$, there exists a finite sum of prime clock machines on $\Omega_2$ that can compute $f$.

PROOF. This theorem follows immediately from corollaries 5 and 7 along with Euclid's second theorem [15] that the number of primes is infinite. □

Furthermore, finding a finite prime clock machine that computes $f$ can be computed with efficient computational procedures because there are efficient computable algorithms that can decide whether a natural number n is prime.

REFERENCES

[1] H. Aiken and G. Hopper. The Automatic Sequence Controlled Calculator, reprinted in B. Randell, ed., The Origins of Digital Computers. Berlin: Springer Verlag, 203-222, 1982.

[2] Jean-Philippe Aumasson, Samuel Neves, Zooko Wilcox-O'Hearn, Christian Winnerlein. BLAKE. https://131002.net/blake/

[3] J. Bardeen and W. H. Brattain. The Transistor, A Semi-Conductor Triode. Physical Review, 74, 230, Jul. 15, 1948.

[4] S. Banik, A. Bogdanov, T. Isobe, K. Shibutani, H. Hiwatari, T. Akishata, F. Regazzoni: Midori: A Block Cipher for Low Energy. In: T. Iwata, J. H. Cheon (eds.) ASIACRYPT 2015. LNCS, vol. 9453, pp. 411-436. Springer, Heidelberg (2015)

[5] Daniel Bernstein. Cache-timing attack on AES. 2005. http://cr.yp.to/antif orgery/cachetiming-20050414.pdf

[6] Guido Bertoni, Joan Daemen, Michael Peeters, Gilles Van Assche. Keccak Reference 3.0 2011. http://keccak.noekeon.org/ http://en.wikipedia.org/wiki/Keccak

[7] A. W. Burks and A. R. Burks, The ENIAC: First General Purpose Electronic Computer, Annals of the History of Computing, 3, 4, 310-399, 1981.

[8] John Conway and Simon Kochen. The Strong Free Will Theorem. Notices of the American Mathematical Society. 56(2), 226232, February 2009.

[9] Stephen Cook. The P VS NP Problem. http://www.claymath.org/sites/default/files/pvsnp.pdf

[10] Thomas W. Cusick and Pante Stanica. Cryptographic Boolean Functions and Applications. Academic Press (2009)

[11] Niels Ferguson, Stefan Lucks, Bruce Schneier, Doug Whiting, Mihir Bellare, Tadayoshi Kohno, Jon Callas, Jesse Walker. The Skein Hash Function Family. 2010. https://www.schneier.com/skeinl.3.pdf http://en.wikipedia.org/wiki/Skein_(hash_function)

[12] Klint Finley. Chinese Supercomputer Is Still the Worlds Most Powerful. Wired Magazine. Nov. 18, 2013.

[13] Praveen Gauravaram, Lars Knudsen, Krystian Matusiewicz, Florian Mendel, Christian Rechberger, Martin Schlffer, and Sren S. Thomsen. Grstl a SHA-3 candidate. http://www.groestl.info

[14] Paul Halmos, S. Givant: Logic as Algebra. The Mathematical Association of America (1998)

[15] G. H. Hardy and E. M. Wright: An Introduction to the Theory of Numbers. Oxford University Press, 6th edition, Oxford (2008)

[16] J. Hennessy, D. Patterson: Computer Architecture. A Quantitative Approach. 5th Edition, Elsevier (2012)

[17] Intel 64 and IA-32 Architectures Software Developers Manual. April (2016)

[18] Jack Kilby. Miniaturized Electronic Circuits. U.S. Pat. No. 3,138,743. 1959.

[19] Simon Kochen and E. P. Specker. The Problem of Hidden Variables in Quantum Mechanics. Journal of Mathematics and Mechanics. Vol. 17, No. 1, 5987 (1967)

[20] Paul Kocher, Joshua Jaffe and Benjamin Jun. Differential Power Analysis. Advances in Cryptology—Crypto 99 Proceedings. LNCS Volume 1666, M. Weiner, edited, Springer-Verlag, (1999).

[21] J. E. Lilienfeld. Method and apparatus for controlling electric currents. U.S. Pat. No. 1,745,175: Jan. 28, 1930. Oct. 8, 1926.

[22] J. E. Lilienfeld. Device for controlling electric current. U.S. Pat. No. 1,900,018: Mar. 7, 1933. Mar. 28, 1928.

[23] Carver Mead. Analog VLSI and Neural Systems. Addison-Wesley Publishing Company (1989)

[24] Lily Hay Newman. What We Know About Friday's Massive East Coast Internet Outage. Wired Magazine. Oct. 21, 2016. https://www.wired.com/2016/10/internet-outage-ddos-dns-dyn/

[25] NIST. FIPS-180-2: Secure Hash Standard, August 2002. http://www.itl.nist.gov/fipspubs/.

[26] Robert N. Noyce. Semiconductor Device-and-Lead Structure. U.S. Pat. No. 2,981,877. 1959.

[27] M. Riordan, Lillian Hoddeson, and Conyers Herring. The invention of the transistor. Reviews of Modern Physics, vol. 71, no. 2, Centenary 1999. American Physical Society, 1999.

[28] Claude Shannon: The synthesis of two-terminal switching circuits. Bell Systems Technical Journal. 28, 59-98, (1949)

[29] Alan M. Turing. On computable numbers, with an application to the Entscheidungsproblem. Proc. London Math. Soc. Series 2 42 (Parts 3 and 4), 230265 (1936). A correction, ibid. 43, 544546 (1937).

[30] Alan M. Turing. Proposals for Development in the Mathematics Division of an Automatic Computing Engine (ACE), Report E882. NPL, 1945.

[31] Herbert Vollmer: Introduction to Circuit Complexity. Springer, Heidelberg (1999)

[32] A. F. Webster and S. E. Tavares. On the Design of S-Boxes. Advances in Cryptology. CRYPTO 85 Proceedings. LNCS 218. Springer, 523-534, 1986.

[33] Hongjun Wu. The Hash Function JH. 2011. http://ehash.iaik.tugraz.at/wiki/JH http://www3.ntu.edu.sg/home/wuhj/research/jh/jh_round3.pdf

[34] Hao Yan, Liping Feng, Thomas H. LaBean and John H. Reif. Parallel Molecular Computations of Pairwise Exclusive-Or (XOR) Using DNA String Tile Self-Assembly. J. Am. Chem. Soc., 125, 47, 14246-14247, 2003.

[35] Konrad Zuse. Patentanmeldung Z-2391, German Patent Office, 1941.

[36] Konrad Zuse. Der Computer mein Lebenswerk. Springer-Verlag, 1970.

The invention claimed is:

1. A computing machine for performing computations comprising: one or more periodic machines that comprise the computing machine; wherein an input to each of the one or more periodic machines is a time state;

wherein each of the one or more periodic machines generates an output; wherein each said periodic machine has a period and a phase; wherein the phase is a time state at which the periodic machine's output changes; wherein a multiple of the period plus the phase is a time at which the periodic machine's output changes; wherein combining of one or more outputs from each said periodic machine generates the output for the computing machine; wherein the output is a voltage.

2. The computing machine of claim 1, wherein the output is at least part of a computation of a cryptographic cipher.

3. The computing machine of claim 1, wherein the combining of the one or more outputs adds each of the one or more periodic machines output of each of the one or more periodic machines.

4. The computing machine of claim 1, wherein the combining of the one or more outputs comprises the following: there are n distinct periodic machines with n>=1; each of the one or more periodic machines producing the output from the input time state; wherein a high voltage output at the input time state represents a 1 bit in the computation; wherein a low voltage output at the output time state represents a 0 bit in the computation.

5. The computing machine of claim 1, wherein the one or more periodic machines are implemented with one or more flip flops.

6. The computing machine of claim 1, wherein the one or more periodic machines are implemented with a field-programmable gate array.

7. The computing machine of claim 1, wherein at least some of phases of the one or more periodic machines are chosen based on a non-deterministic process.

8. A computing machine for performing computations comprising: one or more periodic machines that comprise the computing machine; wherein an input to each of the one or more periodic machines is a time state; wherein each of the one or more periodic machines generates an output; wherein each of the one or more periodic machines has a period and a phase; wherein the phase is a time state at which the periodic machine's output changes; wherein a multiple of the period plus the phase is a time at which the periodic machine's output changes; wherein combining of one or more outputs from each of the one or more periodic machines generates the output for the computing machine; wherein the combining comprises the following: there are n distinct periodic machines with n>1; each of the one or more periodic machines producing the output from its the input; adding the outputs from each of the one or more periodic machines and resulting in a sum; wherein the sum represents the output of a computation.

9. The computing machine of claim 8, wherein the output is at least part of a computation of a cryptographic cipher.

10. The computing machine of claim 8, wherein the output is at least part of a computation of a Midori cipher.

11. The computing machine of claim 8, wherein the one or more periodic machines are implemented with a one or more flip flops.

12. The computing machine of claim 1, wherein the one or more periodic machines are implemented with a field-programmable gate array.

13. A computing process for performing a computational procedure comprising: one or more clock machines that comprise the computing process: constructing a first method of a multiplicity of possible methods for a first instance of the computational procedure; performing the first instance of the computational procedure with the one or more clock machines; constructing a second method of the multiplicity of possible methods for a second instance of the computational procedure; and performing the second instance of the computational procedure with the one or more clock machines; wherein the one or more clock machines performing the first instance of the computational procedure are not identical to the one or more clock machines performing the second instance of the computational procedure; wherein the first instance of the computational procedure and the second instance of the computational procedure perform the same operation, but the first instance of the computational procedure performs the operation, via the first method, and the second instance of the computational procedure performs the computational procedure, via the second method; wherein the computational procedure implements a cryptographic cipher; wherein the constructing of the first instance of the computational procedure and the constructing of the second instance of the computational procedure are based on a non-deterministic process; wherein the non-deterministic process is based at least on a behavior of photons.

14. The computing process of claim 13, wherein at least one of the one or more clock machines performing the second instance of the computational procedure has a different period than each of the one or more clock machines performing the first instance of the computational procedure.

15. The computing process of claim 13, wherein the first instance of the computational procedure uses two or more clock machines and at least two of the two or more clocks machines have a different number of periods.

16. The computing process of claim 13, wherein at least one or more clock machines is implemented with one or more flip flops.

17. The computing process of claim 16, wherein said flip flops are implemented with a semiconductor material.

18. The computing process of claim 13, wherein at least one of the one or more clock machines is implemented as a virtual machine.

19. The computing process of claim 13, wherein the computational procedure implements a cryptographic cipher.

20. The computing process of claim 13, wherein the computational procedure implements a Midori cipher.

21. The computing process of claim 13, wherein said photons are absorbed by a photodetector.

22. The computing process of claim 13 further comprising: emitting the photons from a light emitting diode.

23. A computing system for performing a computational procedure comprising:
one or more clock machines that comprise the computing system; wherein the computational procedure performs a finite number of Boolean operations; constructing a first method of a multiplicity of possible methods for a first instance of the procedure; performing the first instance of the computational procedure with the one or more clock machines; constructing a second method of the multiplicity of possible methods for a second instance of the computational procedure; and performing the second instance of the procedure with the one or more clock machines; wherein the one or more clock machines performing the first instance of the computational procedure are not identical to the one or more clock machines performing the second instance of the computational procedure; wherein the first instance of the computational procedure and the second instance of the computational procedure perform the same Boolean operations, but the first instance of the computational procedure performs the Boolean operations operation, via the first method, and the second instance of the computational procedure performs the computational procedure, via the second method; wherein the constructing of the first instance of the computational procedure and the constructing of the second instance of the computational procedure are based on a non-deterministic process.

24. The computing system of claim 23, wherein the constructing of the first instance of the computational procedure and the constructing of the second instance of the computational procedure are based on the non-deterministic process; wherein the non-deterministic process is based at least on a behavior of photons.

* * * * *